United States Patent
Zheng et al.

(10) Patent No.: US 11,456,783 B2
(45) Date of Patent: Sep. 27, 2022

(54) EIRP CONTROL METHOD, COMMUNICATIONS APPARATUS, AND COMMUNICATIONS SYSTEM

(71) Applicant: HUAWEI TECHNOLOGIES CO., LTD., Guangdong (CN)

(72) Inventors: Xiaojun Zheng, Shanghai (CN); Jiang Guo, Shanghai (CN); Wei Chen, Shanghai (CN); Qiang Zhu, Shanghai (CN); Chunlin Xue, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/380,807

(22) Filed: Jul. 20, 2021

(65) Prior Publication Data

US 2021/0351815 A1    Nov. 11, 2021

Related U.S. Application Data

(63) Continuation of application No. PCT/CN2020/073823, filed on Jan. 22, 2020.

(30) Foreign Application Priority Data

Jan. 22, 2019  (CN) .......................... 201910059033.6

(51) Int. Cl.
*H04B 7/0426* (2017.01)
*H04B 7/0452* (2017.01)
(Continued)

(52) U.S. Cl.
CPC ........... *H04B 7/043* (2013.01); *H04B 7/0452* (2013.01); *H04W 72/0473* (2013.01); *H04W 72/087* (2013.01)

(58) Field of Classification Search
CPC .... H04B 7/043; H04B 7/0452; H04B 7/0695; H04B 17/102; H04B 7/06; H04B 17/101;
(Continued)

(56) References Cited

U.S. PATENT DOCUMENTS

| 11,223,408 B2 * | 1/2022 | Chapman ............. H04B 7/0695 |
| 2007/0046539 A1 * | 3/2007 | Mani .................... H04B 7/0691 342/383 |

(Continued)

FOREIGN PATENT DOCUMENTS

| CN | 1527633 A | 9/2004 |
| CN | 101283525 A | 10/2008 |

(Continued)

OTHER PUBLICATIONS

Extended European Search Report issued in European Application No. 20744967.9 dated Feb. 9, 2022, 7 pages.
(Continued)

*Primary Examiner* — Vineeta S Panwalkar
(74) *Attorney, Agent, or Firm* — Fish & Richardson P.C.

(57) ABSTRACT

The present disclosure relates to equivalent isotropically radiated power (EIRP) control methods and communications apparatus. In one example method, an EIRP threshold of a spatial grid is determined, where the EIRP threshold of the spatial grid is related to a safety distance of the spatial grid, and a plurality of beams are controlled, so that a total EIRP of the plurality of beams in the spatial grid is less than or equal to the EIRP threshold.

20 Claims, 8 Drawing Sheets

S301: Determine an equivalent isotropically radiated power EIRP threshold of a spatial grid $X_n$ S302: Control a total EIRP of a plurality of beams in the spatial grid, so that the total EIRP is less than or equal to the EIRP threshold $E_n$

(51) Int. Cl.
*H04W 72/04* (2009.01)
*H04W 72/08* (2009.01)

(58) Field of Classification Search
CPC .......... H04W 72/0473; H04W 72/087; H04W 52/367; H04W 52/42
See application file for complete search history.

(56) References Cited

U.S. PATENT DOCUMENTS

| 2014/0235287 A1 | 8/2014 | Maltsev et al. |
| 2015/0215029 A1 | 7/2015 | Lemme |
| 2020/0037254 A1* | 1/2020 | Comsa ................ H04W 52/281 |

FOREIGN PATENT DOCUMENTS

| CN | 102017465 A | 4/2011 |
| CN | 104396157 A | 3/2015 |
| CN | 108432153 A | 8/2018 |
| WO | 2017059892 A1 | 4/2017 |
| WO | 2018056876 A1 | 3/2018 |
| WO | 2018064009 A1 | 4/2018 |

OTHER PUBLICATIONS

Office Action issued in Chinese Application No. 201910059033.6 dated Apr. 7, 2021, 16 pages (with English translation).
PCT International Search Report and Written Opinion issued in International Application No. PCT/CN2020/073823 dated Apr. 21, 2020, 15 pages (with English translation).
Wu, "Differentiation of Antenna Radiated Power and Related Units—Analysis of Concepts of Erp/eirp and dBd/dBi," China Academic Journal Electronic Publishing House, Oct. 2008, 7 pages (with English translation).

* cited by examiner

|  | Horizontal plane angle (unit: degree) | | | | | |
|---|---|---|---|---|---|---|
|  |  | 35–55 | 55–75 | 75–95 | 95–115 | 115–135 | 135–155 |
| Vertical plane angle (unit: degree) | 75–85 | Spatial grid $X_0$ | Spatial grid $X_1$ | Spatial grid $X_2$ | Spatial grid $X_3$ | Spatial grid $X_4$ | Spatial grid $X_5$ |
|  | 85–95 | Spatial grid $X_6$ | ... | ... | ... | ... | ... |
|  | 95–105 | ... | ... | ... | ... | ... | ... |
|  | 105–115 | ... | ... | ... | ... | ... | ... |
|  | 115–125 | ... | ... | ... | ... | ... | ... |
|  | 125–135 | ... | ... | ... | ... | ... | ... |
|  | 135–145 | ... | ... | ... | ... | ... | ... |
|  | 145–155 | ... | ... | ... | ... | ... | ... |
|  | 155–165 | ... | ... | ... | ... | ... | ... |
|  | 165–175 | ... | ... | ... | ... | ... | ... |
|  | 175–185 | ... | ... | ... | ... | ... | ... |
|  | 195–205 | ... | ... | ... | ... | ... | Spatial grid $X_{71}$ |

FIG. 6b

| Stream $M_0 - 1$ | ... | Stream 0 | $RBG_0$ |
|---|---|---|---|
| Stream $M_1 - 1$ | ... | Stream 0 | $RBG_1$ |
| Stream $M_2 - 1$ | ... | Stream 0 | $RBG_2$ |
| | | | ... |
| | | | ... |
| | | | ... |
| Stream $M_{R-2} - 1$ | ... | Stream 0 | $RBG_{R-2}$ |
| Stream $M_{R-1} - 1$ | ... | Stream 0 | $RBG_{R-1}$ |

EIRP CONTROL METHOD, COMMUNICATIONS APPARATUS, AND COMMUNICATIONS SYSTEM

CROSS-REFERENCE TO RELATED APPLICATIONS

This application is a continuation of International Application No. PCT/CN2020/073823, filed on Jan. 22, 2020, which claims priority to Chinese Patent Application No. 201910059033.6, filed on Jan. 22, 2019. The disclosures of the aforementioned applications are hereby incorporated by reference in their entireties.

TECHNICAL FIELD

This application relates to the field of wireless communications technologies, and in particular, to an EIRP control method, a communications apparatus, and a communications system.

BACKGROUND

With development of wireless communications technologies, when spectrum resources are increasingly saturated, a MIMO technology emerges, By using the MIMO technology, an access network device can communicate with a plurality of terminals on a same time-frequency resource in a spatial multiplexing manner. This greatly increases a capacity of a communications system.

A power and an antenna gain of the access network device using the MEMO technology are larger than those of a conventional access network device. Each country/organization has its own requirement on an EMF strength. How to control an EMF strength of the access network device, to meet the EMF strength requirement of each country/organization is an urgent problem to be resolved.

SUMMARY

Embodiments of this application provide an EIRP control method, a communications apparatus, and a communications system, to control an EIRP of an access network device, so that an EMF strength of the access network device satisfies an EMF strength requirement of each country organization.

According to a first aspect, an embodiment of this application provides an EIRP control method. The EIRP control method may be applied to an access network device or a chip in an access network device, for example, may be performed by a baseband processing unit (e.g. baseband unit, BBU) or a chip in a BBU.

The method includes: determining an EIRP threshold $E_n$ of a spatial grid $X_n$, where $E_n$ is related to a safety distance $R_n$, of $X_n$, n is any integer from 0 to N−1, N is a quantity of spatial grids, and N is greater than or equal to 1; and controlling an EIRP of a plurality of beams in $X_n$, so that the EIRP is less than or equal to $E_n$.

Optionally, the EIRP of the plurality of beams in $X_n$ may be understood as a total EIRP of the plurality of beams in $X_n$.

An EIRP of the access network device may be controlled at a granularity of a spatial grid, to control an EMF strength of the access network device.

Optionally, in the method, that $E_n$ is related to $R_n$ of $X_n$ includes:

when N is greater than or equal to 2, if a safety distance $R_i$ of a spatial grid $X_i$ is different from a safety distance $R_j$ of a spatial grid $X_j$, an EIRP threshold $E_i$ of $X_i$ is different from an EIRP threshold. $E_j$ of $X_j$, where i and j each are an integer from 0 to N−1, and i is not equal to j.

When safety distances of two spatial grids are different, EIRP thresholds of the two spatial grids are also different. An EIRP of a spatial grid may be flexibly controlled based on an EIRP threshold of the spatial grid, to avoid MIMO performance deterioration caused by limiting EIRPs in all spatial directions based on a safety distance in a specific spatial direction. According to this solution, MIMO performance can be maintained when a local EMF requirement is satisfied.

Optionally, in the method, a relationship among $E_n$, $R_n$, and an EMF strength threshold S satisfies: $E_n = a*S^b*R_n^c$, where a, b, and c are positive numbers.

For example, a is $4\pi$, b is 1, and c is 2. The foregoing relationship is an implementation, and there may be another relationship among $E_n$, $R_n$, and the EMF strength threshold S.

Optionally, in the method, a horizontal plane angle range of $X_n$ is from a minimum horizontal plane angle $\varphi_n^{min}$ to a maximum horizontal plane angle $\varphi_n^{max}$, and a vertical plane angle range of $X_n$ is from a minimum vertical plane angle $\theta_n^{min}$ to a maximum vertical plane angle $\theta_n^{max}$.

Optionally, in the method, an antenna gain corresponding to a horizontal plane angle $\varphi_n^1$ and a vertical plane angle $\theta_n^1$, (which may be represented as $\varphi_n^1, \theta_n^1$)) is $G_n^1$, an antenna gain corresponding to a horizontal plane angle $\varphi_n^2$ and a vertical plane angle $\theta_n^2$ (which may be represented as $(\varphi_n^2, \theta_n^2)$ is $G_n^2$, and a difference between $G_n^1$ and $G_n^2$ is less than or equal to a difference threshold, where $\varphi_n^1$ and $\varphi_n^2$ each are a value from $\varphi_n^{min}$ to $\varphi_n^{max}$, $\theta_n^1$ and $\theta_n^2$ each are a value from $\theta_n^{min}$ to $\theta_n^{max}$, and $\varphi_n^1$ is not equal to $\varphi_n^2$, or $\theta_n^1$ is not equal to $\theta_n^2$.

A difference between antenna gains in two directions in the spatial grid is not excessively large, so that the EIRP of the spatial grid can be subsequently controlled. For example, the EIRP of the spatial grid can be controlled by controlling a power of the spatial grid.

Optionally, in the method, when N is greater than or equal to 2, $\varphi_x^{max} - \varphi_x^{min} = \varphi_y^{max} - \varphi_y^{min}$, or $\theta_x^{max} - \theta_{min} = \theta_y^{max} - \theta_y^{min}$, where x is an integer from 0 to N−1, y is an integer from 0 to N−1, and x is not equal to y.

Lengths of horizontal plane angle ranges of spatial grids are the same, and lengths of vertical plane angle ranges of the spatial grids are the same, so that several spatial grids can be relatively simply determined.

Optionally, in the method, when N is greater than or equal to 2, $\varphi_x^{max} - \varphi_x^{min} \neq \varphi_y^{max} - \varphi_y^{min}$, or $\theta_x^{max} - \theta_x^{min} \neq \theta_y^{max} - \theta_y^{min}$, where x is an integer from 0 to N−1, y is an integer from 0 to N−1, and x is not equal to y.

Lengths of horizontal plane angle ranges of spatial grids are different, or lengths of vertical plane angle ranges of the spatial grids are different, and a difference between antenna gains in two spatial directions in the spatial grid is not excessively large, so that a relatively small quantity of spatial grids can be determined. This reduces algorithm complexity.

Optionally, in the method, $R_n$ is a safety distance corresponding to a horizontal plane angle $\varphi_n^d$ and a vertical plane angle $\theta_n^d$, where $\varphi_n^d$ is a value from $\varphi_n^{min}$ to $\varphi_n^{max}$, and $\theta_n^d$ is a value from $\theta_n^{min}$ to $\theta_n^{max}$.

The horizontal plane angle $\varphi_n^d$ and the vertical plane angle $\theta_n^d$ indicate a spatial direction in the spatial grid $X_n$, and the spatial direction may be determined by $(\varphi_n^d, \theta_d^n)$.

Optionally, the method further includes:

controlling a mapping power of the plurality of beams in $X_n$, so that the EIRP of $X_n$ does not exceed $E_n$.

Optionally, the mapping power of the plurality of beams in $X_n$ may be understood as a total mapping power of the plurality of beams in $X_n$.

After a structure of an antenna for transmitting the plurality of beams is determined, an antenna gain of each spatial grid may be determined, and a mapping power of the plurality of beams in the spatial grid may be controlled, so that an EIRP of the spatial grid does not exceed an EIRP threshold.

Optionally, in the method, the controlling a mapping power of the plurality of beams in $X_n$, so that the EIRP of $X_n$ does not exceed $E_n$ includes:

determining an antenna gain $G$ of $X_n$; and controlling the mapping power of the plurality of beams in $X_n$ to be less than or equal to a power threshold $P_n$, where $P_n$ is obtained based on $E_n$ and $G_n$.

Optionally, in the method, the mapping power of the plurality of beams in $X_n$ includes an instantaneous mapping power of the plurality of beams in $X_n$.

Optionally, the instantaneous mapping power of the plurality of beams in $X_n$ may be understood as an instantaneous total mapping power of the plurality of beams in $X_n$.

Through control of the instantaneous mapping power, it can be ensured that an EMF strength of the plurality of beams in the spatial grid $X_n$ does not exceed the EMF strength threshold at any moment. This ensures that radiation of deployment of the access network device 11 is controlled within a specific range at any moment, so that the deployment of the access network device 11 satisfies a local requirement.

Optionally, in the method, the mapping power of the plurality of beams in $X_n$ includes an average mapping power of the plurality of beams in $X_n$ in a time period T, where the average mapping power of the plurality of beams in $X_n$ in the time period T is an average value of instantaneous mapping powers of the plurality of beams in $X_n$ in the time period T.

Optionally, the average mapping power of the plurality of beams in $X_n$ may be understood as an average total mapping power of the plurality of beams in $X_n$.

Non-ionizing radiation in an EMF may affect an organism in an accumulative time period. Through control of the average mapping power of the plurality of beams in the spatial grid, an average EMF strength in a time period may be controlled to not exceed the threshold, so that deployment of the access network device 11 satisfies a local requirement.

Optionally, in the method, the time period T includes a moment t1, and an instantaneous mapping power of the plurality of beams in $X_n$ at the moment t1 is greater than $P_n$.

The instantaneous mapping power of the plurality of beams in the spatial grid $X_n$ may be greater than the power threshold, so that performance of the access network device 11 at some moments can be improved. However, the average mapping power is less than or equal to the power threshold, so that the deployment of the access network device 11 satisfies the local requirement, and does not cause a radiation hazard to an organism.

Optionally, in the method, the time period includes a moment t2, and an instantaneous mapping power of the plurality of beams in $X_n$ at the moment t2 is less than or equal to $P_n$.

The instantaneous mapping power of the plurality of beams in the spatial grid $X_n$ may be greater than the power threshold, or may be less than or equal to the power threshold, provided that the average mapping power is less than or equal to the power threshold.

Optionally, in the method, $G_n$ is an antenna gain corresponding to a horizontal plane angle $\varphi_n^g$ and a vertical plane angle $\theta_n^g$ (which may be represented as $(\varphi_n^g, \theta_n^g)$), where $\varphi_n^g$ is a value from $\varphi_n^{min}$ to $\varphi_n^{max}$, and $\theta_n^g$ is a value from $\theta_n^{min}$ to $\theta_n^{max}$.

Optionally, in the method, the instantaneous mapping power of the plurality of beams in $X_n$ includes an instantaneous mapping power that is of the plurality of beams and that is corresponding to a horizontal plane angle $\varphi_n^{P1}$ and a vertical plane angle $\theta_n^{P1}$ (which may be represented as $(\theta_0^{P1}, \theta_n^{P1})$), where $\varphi_n^{P1}$ is a value from $\varphi_n^{min}$ to $\varphi_n^{max}$, and $\theta_n^{P1}$ is a value from $\theta_n^{min}$ to $\theta_n^{max}$.

Optionally, in the method, the average mapping power of the plurality of beams in $X_n$ in T includes an average mapping power that is of the plurality of beams in T and that is corresponding to a horizontal plane angle $\varphi_n^{P2}$ and a vertical plane angle $\theta_n^{P2}$ (which may be represented as $(\varphi_n^{P2}, \theta_n^{P2})$), where $\varphi_n^{P2}$ is a value from $\varphi_n^{min}$ to $\varphi_n^{max}$, and $\theta_n^{P2}$ is a value from $\theta_n^{min}$ to $\theta_n^{max}$; and the instantaneous mapping power of the plurality of beams in $X_n$ includes an instantaneous mapping power that is of the plurality of beams and that is corresponding to the horizontal plane angle $\varphi_n^{P2}$ and the vertical plane angle $\theta_n^{P2}$.

Optionally, the method further includes:

controlling a power of at least one of the plurality of beams to be less than a beam power threshold, so that the mapping power of the plurality of beams in $X_n$ is less than or equal to $P_n$.

A power of one or more of the plurality of beams may be reduced, to control the mapping power of the plurality of beams in the spatial grid.

Optionally, in the method, the at least one beam is at least one beam that is in the plurality of beams and whose mapping power in $X_n$ is greater than a mapping power threshold.

A power of a beam that contributes more to the mapping power of the spatial grid is reduced, so that the mapping power of the spatial grid may be effectively reduced.

Optionally, the method further includes:

sending, to a network management system, the mapping power of the plurality of beams in $X_n$.

Optionally, the mapping power of the plurality of beams in $X_n$ may include the instantaneous mapping power of the plurality of beams in $X_n$ and/or the average mapping power of the plurality of beams in $X_n$.

The network management system can display the mapping power of the plurality of beams in the spatial grid, to help a user obtain a status of the mapping power of the spatial grid.

Optionally, the method further includes:

controlling the antenna gain of $X_n$, so that the EIRP of $X_n$, does not exceed $E_n$.

Through control of the antenna gain of the spatial grid, the access network device can transmit a plurality of beams at an ideal power.

Optionally, the method further includes:

controlling a mapping power and an antenna gain of the plurality of beams in $X_n$, so that the EIRP of $X_n$ does not exceed $E_n$.

Both the antenna gain and the power of the spatial grid may be controlled, so that control may be performed relatively flexibly based on an actual situation, and the EIRP of the spatial grid does not exceed the EIRP threshold.

Optionally, in the method, the controlling an antenna gain of the plurality of beams in $X_n$ includes:

adjusting the antenna gain of the plurality of beams in $X_n$ by controlling a structure of an antenna for transmitting the plurality of beams.

The antenna gain of the plurality of beams in the spatial grid may be adjusted by controlling the structure of the antenna for transmitting the plurality of beams.

Optionally, in the method, the structure of the antenna includes a distance between elements and/or a quantity of elements.

Optionally, in the method, any two of $(\varphi_n^d, \theta_n^d)$, $(\varphi_n^1, \theta_n^1)$, $(\varphi_n^2, \theta_n^2)$, $(\varphi_n^g, \theta_n^g)$, $(\varphi_n^{p1}, \theta_n^{p1})$, and $(\varphi_n^{p2}, \theta_n^{p2})$ may be the same or different.

According to a second aspect, an embodiment of this application provides a method. On a basis of the method in the first aspect, the method further includes: transmitting the plurality of beams.

A BBU of an access network device or a chip in a BBU may perform the method in the first aspect. A remote radio unit (RRU) and an antenna in the access network device may transmit the plurality of beams.

According to a third aspect, an embodiment of this application provides a communications apparatus. The communications apparatus includes a processor, the processor is coupled to a memory, the memory is configured to store a computer program or instructions, and the processor is configured to execute the computer program or the instructions in the memory, to enable the communications apparatus to perform the method in the first aspect. Optionally, the communications apparatus further includes the memory. Optionally, the communications apparatus may be an access network device or a chip in an access network device, for example, a BBU or a chip in a BBU.

According to a fourth aspect, an embodiment of this application provides a processing apparatus. The processing apparatus includes a processor and an interface, the interface is configured to receive code instructions (from an external memory or another component) and transmit the code instructions to the processor, and the processor is configured to run the code instructions to perform a method. Optionally, the processing apparatus may be an access network device or a chip in an access network device, for example, a BBU or a chip in a BBU.

According to a fifth aspect, an embodiment of this application provides a communications apparatus. On a basis of the communications apparatus in the third aspect, the communications apparatus further includes an antenna, and the antenna is configured to send the plurality of beams. Optionally, the communications apparatus may further include an RRU.

According to a sixth aspect, an embodiment of this application provides a communications apparatus. The communications apparatus includes one or more modules, configured to implement the method in the first aspect or the second aspect, and the one or more modules may correspond to the steps in the method in the first aspect or the second aspect.

According to a seventh aspect, an embodiment of this application provides a computer storage medium. The storage medium is configured to store a computer program or instructions. When the program is run on a computer, the computer is enabled to perform the method in the first aspect or the second aspect.

According to an eighth aspect, an embodiment of this application provides a computer program product. The program product includes a program. When the program is run, the method in the first aspect or the second aspect is performed.

BRIEF DESCRIPTION OF DRAWINGS

To describe this application more clearly, the following briefly describes the accompanying drawings used in describing the embodiments. Clearly, the accompanying drawings in the following descriptions show merely some embodiments of the present invention, and a person of ordinary skill in the art may derive other drawings from these accompanying drawings without creative efforts.

FIG. 6b is a schematic diagram of even grid division;

DETAILED DESCRIPTION OF EMBODIMENTS

The following describes technical solutions of this application with reference to the accompanying drawings of this application.

Figure 1:
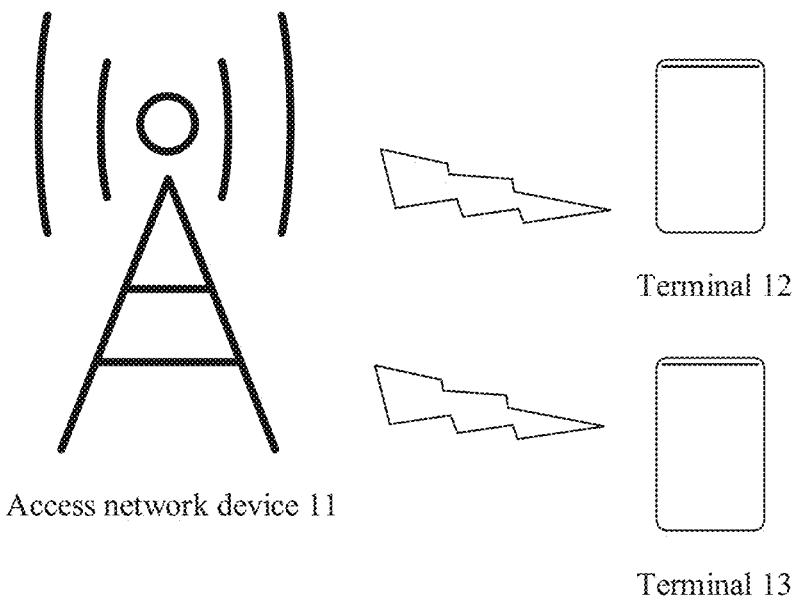
FIG. 1 is a schematic diagram of a communications system according to an embodiment of this application.

An embodiment of the present invention provides a communications system. The communications system includes an access network device and at least one terminal, and the at least one terminal may perform wireless communication with the access network device. FIG. 1 is a schematic diagram of a communications system according to an embodiment of this application. In FIG. 1, an access network device 11 and a terminal 12 may perform wireless communication, and the access network device 11 and a terminal 13 may perform wireless communication. It should be noted that the access network device and the terminals included in the communications system shown in FIG. 1 are merely implementations. In this embodiment of the present invention, a type and a quantity of network elements included in the communications system, and a connection relationship between the network elements are not limited thereto.

A communications system in the embodiments of this application may be a communications system supporting a fourth generation (4G) access technology, for example, a long term evolution (LTE) access technology. Alternatively, the communications system may be a communications system supporting a fifth generation (5G) access technology, for example, a new radio (NR) access technology. Alternatively, the communications system may be a communications system supporting a third generation (3G) access technology, for example, a universal mobile telecommunications system (UMTS) access technology. Alternatively, the communications system may be a communications system supporting a plurality of wireless technologies, for example, a communications system supporting an LTE technology and an NR technology. In addition, the communications system may further be applicable to a future-oriented communications technology.

An access network device in the embodiments of this application may be a device that is on an access network side and that is configured to support a terminal in accessing a communications system, for example, may be a base transceiver station (BTS) or a base station controller (BSC) in a communications system supporting a 2G access technology, a NodeB (NodeB) or a radio network controller (RNC) in a communications system supporting a 3G access technology, an evolved NodeB (eNB) in a communications system supporting a 4G access technology, or a next generation NodeB (gNB), a transmission reception point (TRP), a relay node (relay node), or an access point (AP) in a communications system supporting a 5G access technology.

A terminal in the embodiments of this application may be a device that provides a user with voice or data connectivity. For example, the terminal may also be referred to as user equipment (UE), a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet computer, or the like. With development of wireless communications technologies, a device that can access a communications system, that can communicate with a network side of a communications system, or that can communicate with another object through a communications system may be the terminal in the embodiments of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In the embodiments of this application, the terminal may communicate with an access network device, for example, the access network device 11.

Figure 2:
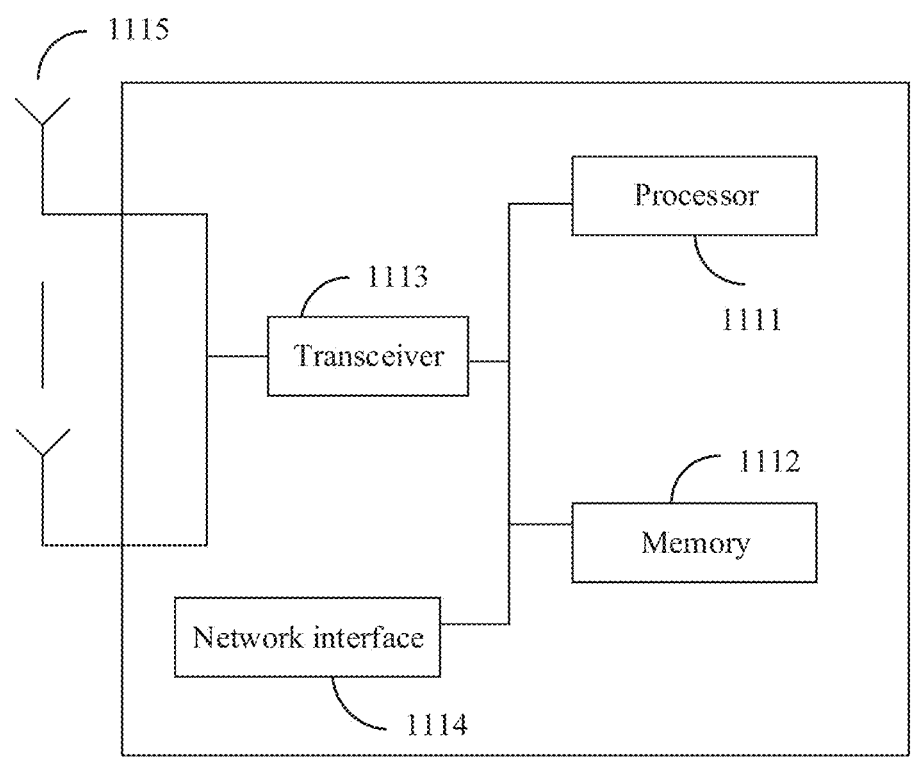
FIG. 2 is a schematic diagram of a structure of an access network device according to an embodiment of this application.

FIG. 2 is a schematic diagram of a structure of an access network device. For a structure of the access network device 11, refer to the structure shown in FIG. 2.

The access network device includes at least one processor 1111, at least one memory 1112, at least one transceiver 1113, at least one network interface 1114, and one or more antennas 1115. The processor 1111, the memory 1112, the transceiver 1113, and the network interface 1114 are connected, for example, via a bus. The antenna 1115 is connected to the transceiver 1113. The network interface 1114 is configured to connect the access network device and another communications device via a communications link. For example, the access network device is connected to a core network element via an S1 interface. In the embodiments of this application, the connection may include various types of interfaces, transmission lines, buses, or the like. This is not limited in the embodiments.

In the embodiments of this application, a processor such as the processor 1111 may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 1111 may be a single-core (e.g. single-CPU) processor or a multi-core (e.g. multi-CPU) processor. The at least one processor 1111 may be integrated into one chip or located on a plurality of different chips.

In the embodiments of this application, a memory such as the memory 1112 may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to cane or store expected program code in a form of instructions or a data structure and that can be accessed by a computer. However, the memory is not limited thereto.

The memory 1112 may exist independently, and is connected to the processor 1111. Optionally, the memory 1112 may alternatively be integrated with the processor 1111, for example, integrated into a chip. The memory 1112 can store program code for performing the technical solutions in the embodiments of this application, and the processor 1111 controls execution of the program code. Various types of executed computer program code may also be considered as drivers of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the access network device and a terminal, and the transceiver 1113 may be connected to the antenna 1115. Specifically, the one or more antennas 1115 may receive a radio frequency signal. The transceiver 1113 may be configured to: receive the radio frequency signal from the antenna, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transceiver 1113 may be configured to: receive a modulated digital baseband signal or digital intermediate frequency signal from the processor 1111, convert the modulated digital baseband signal or digital intermediate frequency signal into a radio frequency signal, and send the radio frequency signal via the one or more antennas 1115. Specifically, the transceiver 1113 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 1113 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver may be referred to as a transceiver circuit, a transceiver unit, a transceiver component, a sending circuit, a sending unit, a sending component, or the like.

Optionally, in FIG. 2, the processor 1111 and the memory 1112 may be located in a BBU, the transceiver 1113 may be located in an RRU, and the access network device 11 may include the BBU, the RRU, and the antenna.

In the communications system shown in FIG. 1, the access network device 11 may send data to the terminal 12 to a terminal 27 in an electromagnetic field (EMF) by using an electromagnetic wave. Non-ionizing radiation (NIR) in the electromagnetic field causes a hazard to an organism. For example, electromagnetic radiation of ultraviolet, light, infrared, and radio waves, and mechanical waves such as infrasonic and ultrasonic waves do not ionize atoms and molecules. The hazard of the NIR to the organism mainly includes a thermal effect, a non-thermal effect, and an accumulative effect. To protect the organism from exposure to the hazard of the NIR, the international commission on non-ionizing radiation protection (ICNIRP) provides "Guidelines for Limiting Exposure to Time-Varying Electric, Magnetic and Electromagnetic Fields", which are referred to as ICNIRP guidelines below for ease of description. Currently, some countries in the world comply with the ICNIRP guidelines, and some countries have special requirements.

Table 1 shows EMF strength requirements of a plurality of countries/organizations. In Table 1, an EMF strength is represented by using a power spectral density, and a unit of the power spectral density is w/m². The power spectral density may be understood as an incident plane wave power density. The EMF strength may be represented by using another unit. This is not limited in the embodiments of this application. For example, the EMF strength may be represented by using an electric field strength, and a unit of the electric field strength is V/m; or the EMF strength may be represented by using a current strength, and a unit of the current strength is A/m. It may be understood that the power spectral density in Table 1 refers to a maximum value of the power spectral density; and when a measured power spectral density is less than the value shown in Table 1, the EMF strength requirement is satisfied.

As shown in Table 1, most countries of the European Union refer to the ICNIRP guidelines: When a frequency (f) range is from 0.4G to 2G, a power spectral density is f/200 w/m²; when a frequency range is above 2G, a power spectral density is 10 w/m². Some countries of the European Union have special requirements: For example, a power spectral density of Switzerland is 0.042 w/m², a power spectral density of Italy and Poland is 0.095 w/m², and a power spectral density of Belgium and Luxembourg is 0.0238 w/m². The Chinese mainland has a special requirement, that is, uses the GB8702B standard: When a frequency range is from 0.03G to 3G, a power spectral density is 0.4 w/m², when a frequency range is from 3G to 15G, a power spectral density is f/7500 w/m²; when a frequency range is from 15G to 30G, a power spectral density is 2 w/m². For other regions/countries, refer to related content in Table 1. Details are not described herein.

| Region/Country | Standards compliance | Frequency range | Power spectral density (w/m²) |
|---|---|---|---|
| European Union | Most countries Refer to the ICNIRP guidelines | 0.4 G-2 G Above 2 G | f/200 10 |
| | Some countries Special requirements | For example, Switzerland: 0.042; Italy and Poland: 0.095; Belgium and Luxembourg: 0.0238 | |
| Asia Pacific | Chinese mainland Special requirement: GB8702B standard | 0.03 G-3 G 3 G-15 G 15 G-30 G | 0.4 f/7500 2 |
| | Australia ARPANSA RPS#3* | Similar to the ICNIRP guidelines | |
| | Hong Kong and New Zealand Refer to the ICNIRP guidelines | / | |
| | Japan Radio Law Enforcement Regulations | Looser than the ICNIRP guidelines | |
| North America and Latin America | United States of America (FCC 47CFR) | 0.3 G-1.5 G 1.5 G-100 G | f/150 10 |
| | Brazil Refer to the ICNIRP guidelines | / | |
| Middle East | Israel and Turkey Refer to the ICNIRP guidelines | / | |

It can be learned from Table 1 that, EMF strength requirements may be different in different frequency ranges. In a frequency range, a power spectral density may be calculated according to the following formula:

$$S = \frac{P*G}{4\pi R^2}, \quad \text{(formula 1)}$$

where S is a power spectral density of a test point, P is an input power of an antenna port, G is an antenna gain, and R is a distance from an antenna to the test point. P*G may be referred to as an equivalent isotropically radiated power (EIRP).

The formula 1 is transformed, and a safety distance R that satisfies a power spectral density of a country or region that deploys an access network device may be obtained based on a power spectral density requirement of the country or region, an input power P of an antenna port of the access network device, and an antenna gain G. For example, the safety distance R may be obtained according to the following formula:

$$R = \sqrt{\frac{P*G}{4\pi S}}, \quad \text{(formula 2)}$$

where S is the power spectral density requirement, P is the input power of the antenna port, and G is the antenna gain. For example, if a MIMO access network device uses a 3.5G frequency band, it is required in the ICNIRP guidelines that a power spectral density be 10 w/m², P be 200 w, and G be 24 dBi. In this case, $$R = \sqrt{\frac{200*10^{\frac{24}{10}}}{4\pi*10}} = 19.98 \text{ m.}$$

In a multi-frequency scenario, a safety distance in the multi-frequency scenario may be obtained based on a safety distance of each frequency. For example, if there are n frequencies, a safety distance $R_1$ of a frequency i may be calculated, and then the safety distance in the multi-frequency scenario is calculated according to the following formula:

$$R = \sqrt{\sum_0^n R_i^2} . \qquad \text{(formula 3)}$$

It can be learned from the foregoing content that in a single-frequency or multi-frequency scenario, when P and G are larger, the safety distance R is larger.

With development of wireless communications technologies, when spectrum resources are increasingly saturated, a MIMO technology emerges. In the communications system shown in FIG. 1, the access network device and the terminal may communicate with each other by using the MIMO technology, and dozens or even hundreds of antennas may be deployed on the access network device 11, so that the access network device 11 can communicate with at least one terminal on a same time-frequency resource in a spatial multiplexing manner. The MIMO technology may be applied to various standards, for example, LTE or NR.

A transmit power and an antenna gain of an access network device using the MIMO technology (which is referred to as a MIMO access network device below for ease of description, for example, the access network device 11) are greater than those of a conventional access network device. Consequently, when the MIMO access network device is deployed, a safety distance of the MIMO access network device is larger than that of the conventional access network device.

This brings a problem to deployment of the MIMO access network device. Usually, to reduce costs of site deployment, the MIMO access network device may be deployed on an existing site. However, for the existing site, only an EMF strength requirement of a frequency of the existing site is considered, and a geographical environment around the existing site is already determined. Consequently, a distance between the existing site and a surrounding building may not satisfy the safety distance required by the MIMO access network device. For example, a safety distance of the existing site is 14 m, and a school is established 15 m away from the existing site in a specific direction. However, the safety distance of the MIMO access network device is 19.98 m, and if the MIMO access network device is deployed at a position of the existing site, an EMF strength at a position of the school that is deployed 15 m away from the site in the specific direction does not satisfy the requirement.

In a related solution, a site on which the MIMO access network device is deployed may be reselected. Consequently, costs of site deployment are relatively large, and a periodicity of the site deployment is longer. In another related solution, a power of the MIMO access network device may be reduced based on the safety distance of the existing site. For example, if the safety distance of the existing site is 14 m, it is required in the ICNIRP guidelines that a power spectral density be 10 w/m², and G be 24 dBi. In this case, $$P = \frac{S*4\pi R^2}{G} = \frac{10*4\pi*14^2}{10^{\frac{24}{10}}} = 98w, \qquad \text{(formula 4)}$$

and the power of the MIMO access network device is reduced to 98 w. Consequently, MIMO performance deteriorates.

Based on the foregoing problem, the embodiments of this application provide a solution for controlling an EIRP. In this solution, space is divided into several spatial grids, and an EIRP of each spatial grid may be controlled, at a granularity of a spatial grid, to not exceed an EIRP threshold of the spatial grid, so that deployment of a MIMO access network device satisfies an EMF strength requirement specified by each country/region.

Figure 3:
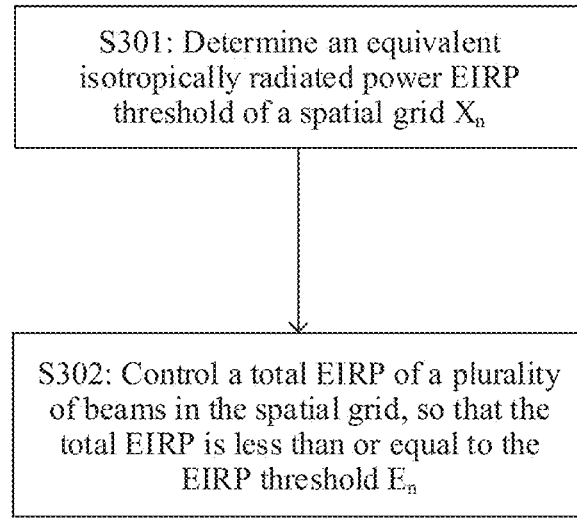
FIG. 3 is a schematic diagram of an EIRP control method according to an embodiment of this application.

FIG. 3 shows an EIRP control method according to this application. The method may be performed by the access network device 11 or a chip in the access network device 11. As shown in FIG. 3:

S301: Determine an equivalent isotropically radiated power EIRP threshold $E_n$ of a spatial grid $X_n$.

$E_n$ is related to a safety distance $R_n$ of the spatial grid $X_n$. n is any integer from 0 to N−1, N is a quantity of spatial grids, and N is greater than or equal to 1.

The following separately describes the spatial grid $X_n$, the safety distance $R_n$, and the EIRP threshold $E_n$.

Optionally, the spatial grid $X_n$ may be understood as a concept of an angle domain, and the spatial grid $X_n$ may include one or more spatial directions.

Optionally, a spatial direction may be determined based on a horizontal plane angle and a vertical plane angle. A horizontal plane angle of a spatial direction may be understood as an angle of the spatial direction on a horizontal plane, and a vertical plane angle of a spatial direction may be understood as an angle of the spatial direction on a vertical plane.

The spatial grid $X_n$ may include a plurality of spatial directions in an angle range, and the angle range includes a horizontal plane angle range and a vertical plane angle range. It may be understood that the spatial grid $X_n$ may be determined based on the horizontal plane angle range and the vertical plane angle range. The horizontal plane angle range of the spatial grid $X_n$ may be understood as an angle range of the spatial grid $X_n$ on the horizontal plane, and the vertical plane angle range of the spatial grid $X_n$ may be understood as an angle range of the spatial grid $X_n$ on the vertical plane.

For example, the horizontal plane angle range of the spatial grid $X_n$ is from a minimum horizontal plane angle $\varphi_n^{min}$ in to a maximum horizontal plane angle $\varphi_n^{max}$, and the vertical plane angle range of the spatial grid $X_n$ is from a minimum vertical plane angle $\theta_n^{min}$ to a maximum vertical plane angle $\theta_n^{max}$. The spatial grid $X_n$ may include all spatial directions in the horizontal plane angle range from $\varphi_n^{min}$ to $\varphi_n^{max}$ and the vertical plane angle range from $\theta_n^{min}$ to $\theta_n^{max}$.

In this implementation, $\varphi_n^{min}$ to $\varphi_n^{max}$ are continuous, and $\theta_n^{min}$ to $\theta_n^{max}$ are continuous. It should be noted that the horizontal plane angle range or the vertical plane angle range may be discontinuous.

Figure 4:
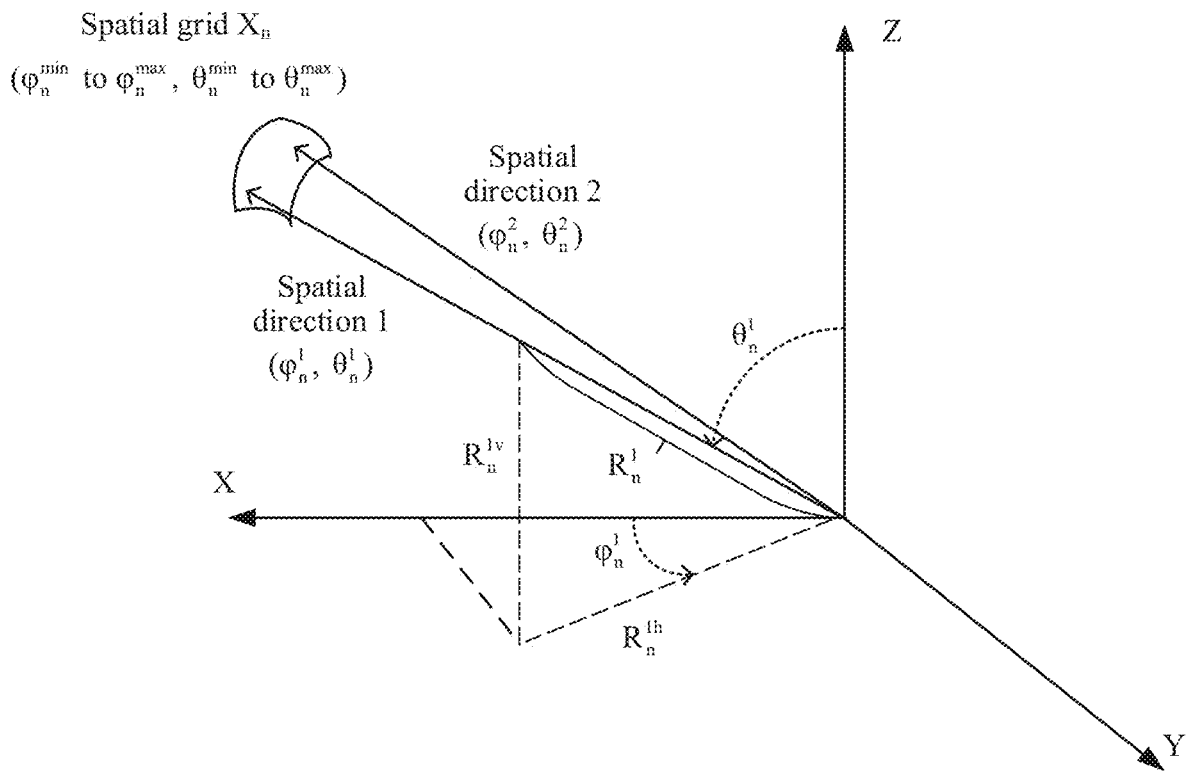
FIG. 4 is a schematic diagram of a coordinate system.

FIG. 4 is a schematic diagram of a coordinate system. As shown in FIG. 4, an origin of the coordinate system may be a position of an antenna, for example, a center point of the antenna, a bottom end of the antenna, or another position in the antenna. The coordinate system includes three coordinate axes: an x-axis, a y-axis, and a z-axis, where a plane formed by the x-axis and the y-axis may be referred to as a horizontal plane, and a plane formed by the y-axis and the z-axis may be referred to as a vertical plane. In the coordinate system, an angle between a projection of a spatial direction on the horizontal plane and the x-axis may be referred to as a horizontal plane angle, and an angle between a projection of a spatial direction on the vertical plane and the z-axis may be referred to as a vertical plane angle.

It may be understood that FIG. 4 is merely an implementation, and the horizontal plane angle and the vertical plane angle may be represented in another manner. For example, an angle between a projection of a spatial direction on the horizontal plane and the y-axis may be referred to as the horizontal plane angle, and an angle between a projection of a spatial direction on the vertical plane and the y-axis may be referred to as the vertical plane angle. It may be understood that the coordinate system in FIG. 4 is also an implementation. The coordinate system may be represented in another manner. Positions of the x-axis, the y-axis, and the z-axis may be interchanged, or directions of the x-axis, the y-axis, and the z-axis may be respectively the same as or opposite to directions of the x-axis, the y-axis, and the z-axis in FIG. 4.

As shown in FIG. 4, in the coordinate system, a spatial direction directed from the origin may be determined based on a horizontal plane angle and a vertical plane angle. For example, a horizontal plane angle of a spatial direction 1 is $\varphi_n^1$, a vertical plane angle of the spatial direction 1 is $\theta_n^1$, and the spatial direction 1 may be represented as $(\varphi_n^1, \theta_n^1)$. For example, a horizontal plane angle of a spatial direction 2 is $\varphi_n^2$, a vertical plane angle of the spatial direction 2 is $\theta_n^2$, and the spatial direction 2 may be represented as $(\varphi_n^2, \theta_n^2)$.

As shown in FIG. 4, the spatial grid $X_n$ may include all spatial directions directed to a curved surface, and all the spatial directions directed to the curved surface satisfies the horizontal plane angle range from $\varphi_n^{min}$ to $\varphi_n^{max}$ and the vertical plane angle range from $\theta_n^{min}$ to $\theta_n^{max}$. For example, the spatial grid $X_n$ includes the spatial direction 1 $(\varphi_n^1, \theta_n^1)$ and the spatial direction 2 $(\varphi_n^2, \theta_n^2)$.

Optionally, $\varphi_n^{min}$ may be equal to $\varphi_n^{max}$. In this case, a projection of the spatial grid $X_n$ on the horizontal plane is one spatial direction.

Optionally, $\varphi_n^{min}$ may be equal to $\theta_n^{max}$. In this case, a projection of the spatial grid $X_n$ on the vertical plane is one spatial direction.

Optionally, $\varphi_n^{min}$ may be equal to $\varphi_n^{max}$ and $\theta_n^{min}$ may be equal to $\theta_n^{max}$. In this case, a projection of the spatial grid $X_n$ on the horizontal plane is one spatial direction and a projection of the spatial grid $X_n$ on the vertical plane is also one spatial direction. It may be understood that in this case, the spatial grid $X_n$ is one spatial direction, a horizontal plane angle of the spatial direction is $\varphi_n^{min}$, and a vertical plane angle of the spatial direction is $\theta_n^{min}$.

Optionally, there may be one or more spatial grids, that is, N may be an integer greater than or equal to 1.

Optionally, one spatial grid $X_n$ may be corresponding to one safety distance $R_n$ and one EIRP threshold $E_n$. For example, when N is 2, there are two spatial grids: $X_0$ (n=0) and $X_1$ (n=1), where a safety distance of $X_0$ is $R_0$, an EIRP threshold of $X_0$ is $E_0$, a safety distance of $X_1$ is $R_1$, and an EIRP threshold of $X_1$ is $E_1$.

The safety distance $R_n$ may be understood as a required distance between an antenna and an organism in the spatial grid $X_n$. For example, in the spatial grid $X_n$, the safety distance $R_n$ may be a required distance between the antenna and a person. Alternatively, for example, in the spatial grid $X_n$, the safety distance $R_n$ may be a distance between the antenna and a nearest building.

Optionally, the safety distance $R_n$ may be determined by an operator or a certain organization, or the safety distance $R_n$ may be a distance that is measured in the spatial grid $X_n$ based on an actual geographical environment and that is between the antenna and a person or between the antenna and a nearest building.

Optionally, the safety distance $R_n$ of the spatial grid $X_n$ may be determined based on a horizontal safety distance of the spatial grid $X_n$ and a vertical safety distance of the spatial grid $X_n$, where the horizontal safety distance of the spatial grid $X_n$ may be a projection of the safety distance $R_n$ of the spatial grid $X_n$ on the horizontal plane, and the vertical safety distance of the spatial grid $X_n$ may be a projection of the safety distance $R_n$ of the spatial grid $X_n$ on the vertical plane.

$E_n$ is related to the safety distance $R_n$ of the spatial grid $X_n$. It may be understood that when $R_n$ takes different values, $E_n$ also takes different values.

Optionally, when N is greater than or equal to 2, safety distances of spatial grids may be the same or different.

Optionally, when N is greater than or equal to 2, if a safety distance $R_i$ of a spatial grid $X_i$ is different from a safety distance $R_j$ of a spatial grid $X_j$, an EIRP threshold $E_i$ of the spatial grid $X_i$ is different from an EIRP threshold $E_j$ of the spatial grid $X_j$, where i and j each are an integer from 0 to N−1, and i is not equal to j.

For example, if the safety distance $R_0$ of the spatial grid $X_0$ is 5 m, and the safety distance $R_1$ of the spatial grid $X_1$ is 4 m, the EIRP threshold $E_0$ of the spatial grid $X_0$ is different from the EIRP threshold $E_1$ of the spatial grid $X_1$.

For example, a relationship among $E_n$, $R_n$, and an EMF strength threshold S may satisfy: $E_n = a*S^b*R_n^c$ (formula 5), where a, b, and c are positive numbers. For example, a is $4\pi$, b is 1, and c is 2.

Optionally, the relationship among $E_n$, $R_n$, and the EMF strength threshold S may alternatively satisfy:

$$E_n = 4\pi*S^1*R_n^2/(1+\gamma)^2; \text{ or}$$

$$E_n = 4\pi*S^1*R_n^2/(1+\gamma)^2/A_{sl}; \text{ or}$$

$$E_n = 4\pi*S^1*R_n^2/(1+\gamma)^2/\sin^2(\alpha+1.229\theta_{bw}).$$

$A_{sl}$ represents a side lobe suppression value, $\alpha$ represents a downtilt, $\theta_{bw}$ represents a vertical half power beamwidth, and $\gamma$ represents a reflection coefficient.

Optionally, the foregoing formulas are merely implementations, and the relationship among $E_n$, $R_n$, and the EMF strength threshold S may alternatively be represented by using another formula. This is not limited in this embodiment of this application.

After the EMF strength threshold S of the spatial grid $X_n$ is determined, the EIRP threshold of the spatial grid $X_n$ may be derived based on the EMF strength threshold S of the spatial grid $X_n$, and then a total EIRP of the spatial grid $X_n$ is controlled based on the EIRP threshold. This can relatively reliably ensure that deployment of the access network device 11 satisfies an EMF strength requirement.

In addition, because EMF strength requirements of different countries/organizations may be different, according to the method, the EIRP may be flexibly controlled based on a local requirement, to ensure the deployment of the access network device 11 and provide communication for the public.

Optionally, in a multi-frequency scenario, an EMF strength threshold of each frequency may be first determined, and then an EIRP of each frequency is controlled.

Optionally, because the spatial grid $X_n$ may include a plurality of spatial directions, there may be one safety distance in each spatial direction, and safety distances in the spatial directions may be the same or different. For example, as shown in FIG. 4, a safety distance in the spatial direction 1 is $R_n^1$.

Optionally, a safety distance in a spatial direction may be obtained based on a horizontal safety distance in the spatial direction and a vertical safety distance in the spatial direction. For example, as shown in FIG. 4, if a horizontal safety distance in the spatial direction 1 is $R_n^{1h}$, and a vertical safety distance in the spatial direction 1 is $R_n^{1v}$, $$R_n^1 = \sqrt{R_n^{1h2} + R_n^{1v2}}. \quad \text{(formula 6)}$$

Optionally, the safety distance of the spatial grid $X_n$ may be a safety distance in one of the plurality of spatial directions. For example, the safety distance of the spatial grid $X_n$ may be a largest safety distance in a plurality of safety distances in the plurality of spatial directions, or may be a smallest safety distance in a plurality of safety distances in the plurality of spatial directions, or may be a safety distance in any one of the plurality of spatial directions.

It may be understood that the horizontal plane angle range of the spatial grid $X_n$ is from $\varphi_n^{min}$ to $\varphi_n^{max}$, the vertical plane angle range of the spatial grid $X_n$ is from $\theta_n^{min}$ to $\theta_n^{max}$, and the safety distance $R_n$ may be a safety distance corresponding to a horizontal plane angle $\varphi_n^d$ and a vertical plane angle $\theta_n^d$, where $\varphi_n^d$ is a value from $\varphi_n^{min}$ to $\varphi_n^{max}$, and $\theta_n^d$ is a value from $\theta_n^{min}$ to $\theta_n^{max}$.

$(\varphi_n^d, \theta_n^d)$ may be a spatial direction of the spatial grid $X_n$. Among the plurality of safety distances in the plurality of spatial directions of the spatial grid $X_n$, a safety distance in the spatial direction $(\varphi_n^d, \theta_n^d)$ is the largest. Alternatively, among the plurality of safety distances in the plurality of spatial directions of the spatial grid $X_n$, a safety distance in the spatial direction $(\varphi_n^d, \theta_n^d)$ is the smallest. Alternatively, $(\varphi_n^d, \theta_n^d)$ may be any spatial direction of the spatial grid $X_n$.

Optionally, the safety distance of the spatial grid $X_n$ may be obtained based on a safety distance in each of a plurality of spatial directions (where the plurality of spatial directions herein may be all or some spatial directions included in the spatial grid $X_n$). For example, the safety distance of the spatial grid $X_n$ may be calculated based on the safety distance in each of the plurality of spatial directions in a specific calculation manner, and the calculation manner may be an averaging calculation manner or another calculation manner. For example, an average value of safety distances in the spatial directions may be calculated, to obtain the safety distance of the spatial grid $X_n$. It should be noted that averaging in this embodiment of this application may be arithmetic averaging, geometric averaging, square averaging, harmonic averaging, weighted averaging, or the like.

Optionally, the determining an EIRP threshold $E_n$ of a spatial grid $X_n$ may include: receiving the EIRP threshold $E_n$ of the spatial grid $X_n$, for example, receiving the EIRP threshold of the spatial grid $X_n$ from a network management system. The network management system may calculate the EIRP threshold $E_n$ of the spatial grid $X_n$, or the network management system may obtain the EIRP threshold $E_n$ of the spatial grid $X_n$ from the operator or the certain organization.

For example, the processor 1111 may receive the EIRP threshold $E_n$ of the spatial grid $X_n$ from the network management system, and the memory 1112 may store the EIRP threshold $E_n$ of the spatial grid $X_n$.

Optionally, the determining an EIRP threshold $E_n$ of a spatial grid $X_n$ may include: determining the EIRP threshold $E_n$ of the spatial grid $X_n$ through calculation. For example, the EIRP threshold $E_n$ of the spatial grid $X_n$ may be obtained based on the safety distance $R_n$ of the spatial grid $X_n$. For example, the EIRP threshold $E_n$ of the spatial grid $X_n$ may be obtained according to the following formula: $E_n = a * S^b * R_n^c$ (formula 5).

Optionally, the processor 1111 may calculate the EIRP threshold $E_n$ of the spatial grid $X_n$, or the processor 1111 may receive the EIRP threshold $E_n$ of the spatial grid. $X_n$ via the network interface 1114. The memory 1112 may store the EIRP threshold $E_n$, the horizontal plane angle range, the vertical plane angle range, the safety distance $R_n$, and the like of the spatial grid $X_n$.

When there are a plurality of spatial grids, because safety distances of the spatial grids may be different, an EIRP of each spatial grid may be flexibly adjusted based on a safety distance of each spatial grid, to avoid MIMO performance deterioration caused by limiting EIRPs in all spatial directions based on a safety distance in a specific spatial direction. According to this solution, MIMO performance can be maintained when the local EMF requirement is satisfied.

S302: Control a total EIRP of a plurality of beams in the spatial grid $X_n$, so that the total EIRP is less than or equal to the EIRP threshold $E_n$.

Optionally, the plurality of beams may include beams covering different terminals, and the beams covering the terminals may use a same time-frequency resource or different time-frequency resources. For example, when a distance between two terminals is relatively long, beams covering the two terminals may occupy a same time-frequency resource; when a distance between two terminals is relatively short, beams covering the two terminals may occupy different time-frequency resources.

The total EIRP of the plurality of beams in the spatial grid $X_n$ may be understood as an EIRP of the spatial grid $X_n$ under a joint action of the plurality of beams, or may be understood as an EIRP that is of the spatial grid $X_n$ and that is obtained through integration or combination of EIRPs of the plurality of beams. In other words, each beam contributes to the EIRP of the spatial grid $X_n$, and the total EIRP of the plurality of beams in the spatial grid $X_n$ may be obtained based on an EIRP contribution of each beam to the spatial grid $X_n$. It should be noted that the total EIRP of the plurality of beams in the spatial grid $X_n$ may be obtained in a summation manner, a product manner, a weighted summation manner, a weighted product manner, an accumulation manner, or another calculation manner based on the EIRP contribution of each beam to the spatial grid $X_n$. This is not limited in this embodiment of this application.

Optionally, the processor 1111 may control the total EIRP of the plurality of beams in the spatial grid $X_n$ to be less than or equal to the EIRP threshold $E_n$.

Optionally, the total EIRP of the plurality of beams in the spatial grid $X_n$ may be determined based on a total mapping power of the plurality of beams in the spatial grid $X_n$ and/or an antenna gain of the spatial grid $X_n$. The following first describes the total mapping power of the plurality of beams in the spatial grid $X_n$ and the antenna gain of the spatial grid $X_n$.

When the access network device 11 transmits a beam in a spatial direction, a power obtained by mapping a power of the beam to the spatial grid $X_n$ may be referred to as a mapping power of the beam in the spatial grid $X_n$.

In a scenario of the plurality of beams, a mapping power of each beam in the spatial grid $X_n$ may be obtained, and then the total mapping power of the plurality of beams in the spatial grid $X_n$ is obtained based on the mapping power of each beam in the spatial grid $X_n$. For example, a sum of mapping powers of the plurality of beams in the spatial grid $X_n$ may be calculated, to obtain the total mapping power of the plurality of beams in the spatial grid $X_n$.

Optionally, because the spatial grid $X_n$ may include a plurality of spatial directions, there is a total mapping power of the plurality of beams in each spatial direction of the spatial grid $X_n$, and total mapping powers of the plurality of beams in the spatial directions of the spatial grid $X_n$ may be the same or different.

Optionally, the total mapping power of the plurality of beams in the spatial grid $X_n$ may be a total mapping power of the plurality of beams in one spatial direction of the spatial grid $X_n$. For example, the total mapping power of the plurality of beams in the spatial grid $X_n$ may be a largest total mapping power in a plurality of total mapping powers obtained after powers of the plurality of beams are mapped to each of spatial directions (where the spatial directions may be all or some spatial directions included in the spatial grid $X_n$) of the spatial grid $X_n$; or may be a smallest total mapping power in a plurality of total mapping powers obtained after powers of the plurality of beams are mapped to each of spatial directions of the spatial grid $X_n$; or may be a total mapping power of the plurality of beams in any spatial direction of the spatial grid $X_n$.

It may be understood that the total mapping power of the plurality of beams in the spatial grid $X_n$ may be a total mapping power that is of the plurality of beams and that is corresponding to a horizontal plane angle $\varphi_n^{P1}$ and a vertical plane angle $\theta_n^{P1}$, where $\varphi_n^{P1}$ is a value from $\varphi_n^{min}$ to $\varphi_n^{max}$, and $\theta_n^{P1}$ is a value from $\theta_n^{min}$ to $\theta_n^{max}$.

$(\varphi_n^{P1}, \theta_n^{P1})$ may be a spatial direction of the spatial grid $X_n$. In the total mapping powers of the plurality of beams in the spatial directions of the spatial grid $X_n$, a total mapping power in the spatial direction $(\varphi_n^{P1}, \theta_n^{P1})$ is the largest. Alternatively, in the total mapping powers of the plurality of beams in the spatial directions of the spatial grid $X_n$, a total mapping power in the spatial direction $(\varphi_n^{P1}, \theta_n^{P1})$ is the smallest. Alternatively, $(\varphi_n^{P1}, \theta_n^{P1})$ may be any spatial direction of the spatial grid $X_n$.

Optionally, the total mapping power of the plurality of beams in the spatial grid $X_n$ may be obtained based on the total mapping powers of the plurality of beams in the spatial directions of the spatial grid $X_n$. For example, the total mapping power of the plurality of beams in the spatial grid $X_n$ may be obtained based on the total mapping power of the plurality of beams in each of the plurality of spatial directions of the spatial grid. $X_n$, for example, in an averaging manner or another calculation manner. For example, the total mapping power of the plurality of beams in each spatial direction of the spatial grid $X_n$ may be calculated, to obtain the plurality of total mapping powers in the plurality of spatial directions, and then an average value of the plurality of total mapping powers is calculated, to obtain the total mapping power of the spatial grid $X_n$.

After a structure of the antenna for transmitting the plurality of beams is determined, the antenna gain of the spatial grid $X_n$ may be determined. In this embodiment of this application, the structure of the antenna for transmitting the plurality of beams may include one or more of a quantity of antenna arrays, a quantity of antenna elements in each antenna array, an arrangement manner of antenna elements in each antenna array, a distance between antenna elements, and another manner. Structures of some antennas for transmitting a plurality of beams are already determined after delivery. However, for some antennas, structures of the antennas for transmitting a plurality of beams may still be flexibly adjusted after delivery, the structures of the antennas for transmitting a plurality of beams may be determined, and then an antenna gain in each spatial direction is determined.

Optionally, because the spatial grid $X_n$ may include a plurality of spatial directions, there is an antenna gain of the plurality of beams in each spatial direction of the spatial grid $X_n$, and antenna gains of the plurality of beams in the spatial directions of the spatial grid $X_n$ may be the same or different.

Optionally, the antenna gain of the plurality of beams in the spatial grid $X_n$ may be an antenna gain of the plurality of beams in one spatial direction of the spatial grid $X_n$. For example, the antenna gain of the plurality of beams in the spatial grid $X_n$ may be a largest antenna gain in antenna gains of the plurality of beams in spatial directions (where the spatial directions may be all or some spatial directions included in the spatial grid $X_n$); or may be a smallest antenna gain in antenna gains of the plurality of beams in spatial directions; or may be an antenna gain of the plurality of beams in any spatial direction of the spatial grid $X_n$.

It may be understood that the antenna gain of the plurality of beams in the spatial grid $X_n$ may be an antenna gain that is of the plurality of beams and that is corresponding to a horizontal plane angle $\varphi_n^g$ and a vertical plane angle $\theta_n^g$, where $\varphi_n^g$ is a value from $\varphi_n^{min}$ to $\varphi_n^{max}$, and $\theta_n^g$ is a value from $\theta_n^{min}$ to $\theta_n^{max}$.

$(\varphi_n^g, \theta_n^g)$ may be a spatial direction of the spatial grid $X_n$. In the plurality of antenna gains of the plurality of beams in the plurality of spatial directions of the spatial grid $X_n$, an antenna gain in the spatial direction $(\varphi_n^g, \theta_n^g)$ is the largest. Alternatively, in the plurality of antenna gains of the plurality of beams in the plurality of spatial directions of the spatial grid $X_n$, an antenna gain in the spatial direction $(\varphi_n^g, \theta_n^g)$ is the smallest. Alternatively, $(\varphi_n^g, \theta_n^g)$ may be any spatial direction of the spatial grid $X_n$.

Optionally, the antenna gain of the plurality of beams in the spatial grid $X_n$ may be obtained based on the antenna gains of the plurality of beams in the spatial directions of the spatial grid $X_n$. For example, the antenna gain of the plurality of beams in the spatial grid $X_n$ may be obtained based on the antenna gain of the plurality of beams in each of the plurality of spatial directions of the spatial grid $X_n$, for example, in an averaging manner, a weighted manner, or another calculation manner. For example, the antenna gain of the plurality of beams in each spatial direction of the spatial grid $X_n$ may be calculated, to obtain the plurality of antenna gains in the plurality of spatial directions, and then an average value of the plurality of antenna gains is calculated, to obtain the antenna gain of the spatial grid $X_n$.

The following describes several application manners of controlling the total EIRP of the spatial grid $X_n$.

Application Manner 1

The total mapping power of the spatial grid $X_n$ may be controlled, so that the total EIRP of the spatial grid $X_n$ does not exceed $E_n$.

In the application manner 1, the antenna gain $G_n$ of the spatial grid $X_n$ may be determined, and the total mapping power of the plurality of beams in the spatial grid $X_n$ is controlled to be less than or equal to a power threshold $P_n$, where $P_n$ is obtained based on $E_n$ and $G_n$, for example, $$P_n = \frac{E_n}{G_n}.$$

After the structure of the antenna for transmitting the plurality of beams is determined, the antenna gain in each spatial direction may be determined. After the antenna gain $G_n$ of the spatial grid $X_n$ is determined, the power threshold $P_n$ of the spatial grid $X_n$ may be obtained based on the EIRP threshold $E_n$ and the antenna gain $G_n$ of the spatial grid $X_n$, for example, $$P_n = \frac{E_n}{G_n}.$$

The total mapping power of the plurality of beams in the spatial grid $X_n$ is controlled, so that the total mapping power of the spatial grid $X_n$ is less than or equal to the power threshold $P_n$, and the total EIRP of the plurality of beams in the spatial grid $X_n$ may be less than or equal to the EIRP threshold $E_n$.

The total mapping power of the plurality of beams in the spatial grid $X_n$ may be an instantaneous total mapping power or an average total mapping power of the plurality of beams in the spatial grid $X_n$. The following separately describes the two implementations.

In an implementation 1 of the application manner 1, the instantaneous total mapping power of the plurality of beams in the spatial grid $X_n$ may be controlled to be less than or equal to the power threshold $P_n$.

Optionally, the instantaneous total mapping power of the plurality of beams in the spatial grid $X_n$ may be an instantaneous total mapping power of the plurality of beams in one spatial direction of the spatial grid $X_n$, for example, may be an instantaneous total mapping power in $(\varphi_n^{P1}, \theta_n^{P1})$. Alternatively, the instantaneous total mapping power of the plurality of beams in the spatial grid $X_n$ may be obtained based on instantaneous total mapping powers of the plurality of beams in spatial directions. For related content, refer to the foregoing related content of the total mapping power of the plurality of beams in the spatial grid $X_n$.

According to the implementation 1, a total EIRP of the plurality of beams in the spatial grid $X_n$ does not exceed the EIRP threshold $E_n$ at any moment, so that an EMF strength of the plurality of beams in the spatial grid $X_n$ does not exceed the EMF strength threshold at any moment. This ensures that radiation of the deployment of the access network device 11 is controlled within a specific range at any moment, and avoids causing a hazard to an organism, so that the deployment of the access network device 11 satisfies the local requirement.

In an implementation 2 of the application manner 1, an average total mapping power of the plurality of beams in the spatial grid $X_n$ in a time period T may be controlled, so that the average total mapping power of the spatial grid $X_n$ is less than or equal to the power threshold $P_n$. For example, a length of the time period T may be six minutes.

Optionally, the average total mapping power of the plurality of beams in the spatial grid $X_n$ in the time period T may be an average total mapping power of the plurality of beams in one spatial direction of the spatial grid $X_n$ in the time period T, for example, may be an average total mapping power in $(\varphi_n^{P2}, \theta_n^{P2})$, where $\varphi_n^{P2}$ is a value from $\varphi_n^{min}$ to $\varphi_n^{max}$, and $\theta_n^{P2}$ is a value from $\theta_n^{min}$ to $\theta_n^{max}$. Herein, $\varphi_n^{P2}$ may be different from $\varphi_n^{P1}$, or $\theta_n^{P2}$ is different from $\theta_n^{P1}$.

Optionally, the average total mapping power of the plurality of beams in the spatial grid $X_n$ is an average value of instantaneous total mapping powers of the plurality of beams in the spatial grid $X_n$. For example, the average total mapping power of the plurality of beams in the spatial grid $X_n$ in the time period T is an average value of instantaneous total mapping powers of the plurality of beams in the spatial grid $X_n$ in the time period T. Alternatively, the instantaneous total mapping power of the plurality of beams in the spatial grid $X_n$ may be obtained based on instantaneous total mapping powers of the plurality of beams in spatial directions. For related content, refer to the foregoing related content of the mapping power of the plurality of beams in the spatial grid $X_n$.

Optionally, the instantaneous total mapping power of the plurality of beams in the spatial grid $X_n$ may be an instantaneous total mapping power in $(\varphi_n^{P2}, \theta_n^{P2})$. For example, in the time period T, a plurality of instantaneous total mapping powers in $(\varphi_n^{P2}, \theta_n^{P2})$ are obtained, and then an average value of the plurality of instantaneous total mapping powers in $(\varphi_n^{P2}, \theta_n^{P2})$ is calculated, to obtain the average total mapping power of the plurality of beams in the spatial grid $X_n$ in the time period T.

For example, some sampling time points may be selected. For example, a plurality of sampling time points are selected in the time period T, instantaneous total mapping powers of the plurality of beams in the spatial grid $X_n$ at these sampling time points are separately obtained, and then the average total mapping power of the plurality of beams in the spatial grid $X_n$ is obtained. A quantity of the sampling time points may be determined based on a capability of the access network device 11. This is not limited in this embodiment of this application.

MIMO beams are time-related. A spatial direction of a beam at a specific moment may be determined based on a position of a terminal. At different moments, directions of a plurality of beams may be different. Therefore, a total mapping power of a spatial grid may vary with time, and a power of the spatial grid $X_n$ may be relatively accurately estimated by calculating the average total mapping power of the spatial grid $X_n$.

In addition, non-ionizing radiation in an EMF may affect an organism in an accumulative time period. For example, according to the ICNIRP guidelines, whether the deployment of the access network device 11 satisfies the requirement is determined based on an average EMF strength within six minutes. The average total mapping power of the plurality of beams in the spatial grid $X_n$ is controlled to be less than or equal to the power threshold $P_n$. Therefore, an average EMF strength in a time period may be controlled to not exceed the threshold, so that the deployment of the access network device 11 satisfies the local requirement.

In the implementation 2, an instantaneous total mapping power of the plurality of beams in the spatial grid $X_n$ at a moment may be greater than or equal to the power threshold $P_n$, and an instantaneous total mapping power of the plurality of beams in the spatial grid $X_n$ at another moment may be less than or equal to the power threshold $P_n$. In this way, the average total mapping power of the plurality of beams in the spatial grid $X_n$ is less than or equal to the power threshold $P_n$. For example, the time period T includes a moment t1 and a moment t2, where an instantaneous total mapping power of the plurality of beams in the spatial grid $X_n$ at the moment t1 is greater than the power threshold $P_n$, and an instantaneous total mapping power of the plurality of beams in the spatial grid $X_n$ at the moment t2 is less than or equal to the power threshold $P_n$.

Optionally, the access network device 11 may predict, by using T as a sliding time window and based on the power threshold $P_n$ and instantaneous total mapping powers of the spatial grid $X_n$ at several moments in the time period T, an instantaneous total mapping power of the spatial grid $X_n$ at a next moment. Therefore, the instantaneous total mapping power of the spatial grid $X_n$ at the next moment is controlled to be less than a predicted value, to achieve an objective that the average total mapping power of the spatial grid $X_n$ is less than or equal to the power threshold $P_n$.

The average total mapping power of the plurality of beams in the spatial grid $X_n$ is controlled to be less than or equal to the power threshold $P_n$. Therefore, an instantaneous total mapping power of the plurality of beams in the spatial grid $X_n$ may be greater than the power threshold, so that performance of the access network device 11 at some moments can be improved. In general, the deployment of the access network device 11 satisfies the local requirement and does not cause a radiation hazard to an organism, and performance of the access network device 11 can be maintained and user experience is improved.

To control the total mapping power of the plurality of beams in the spatial grid $X_n$ to be less than or equal to the power threshold $P_n$, this embodiment of this application provides the following implementation manners.

Optionally, a power of at least one of the plurality of beams may be controlled to be less than a beam power threshold. Therefore, a contribution that the at least one beam makes to a mapping power in the spatial grid $X_n$ is reduced, so that the total mapping power of the spatial grid $X_n$ is less than or equal to the power threshold $P_n$.

Optionally, the at least one beam may be at least one beam that is in the plurality of beams and whose mapping power in the spatial grid $X_n$ is greater than a mapping power threshold. Herein, the mapping power that is in the spatial grid $X_n$ and that is greater than the mapping power threshold may be an instantaneous mapping power (for example, at a moment in the time period T) in the spatial grid $X_n$, or may be an average mapping power (for example, may be an average mapping power in the spatial grid $X_n$ in the time period T) in the spatial grid $X_n$.

A power of a beam that makes a greatest contribution to the mapping power of the spatial grid $X_n$ is reduced. Therefore, the total mapping power of the spatial grid $X_n$ may be effectively reduced, so that the total mapping power of the spatial grid $X_n$ is less than or equal to the power threshold $P_n$.

Optionally, the at least one beam may include a data channel beam.

A power of the data channel beam is reduced while a power of a control channel beam is not reduced, so that performance of terminal access can be ensured.

Optionally, the at least one beam may include a data channel beam and a broadcast channel beam.

According to an application manner 2, the antenna gain of the spatial grid $X_n$ may be controlled, so that the total EIRP of the spatial grid $X_n$ does not exceed $E_n$.

Application Manner 2

That the antenna gain of the spatial grid $X_n$ is controlled may be: The antenna gain of the plurality of beams in $X_n$ may be adjusted by controlling the structure of the antenna for transmitting the plurality of beams, where the structure of the antenna for transmitting the plurality of beams may include one or more of a quantity of antenna arrays, a quantity of antenna elements in each antenna array, an arrangement manner of antenna elements in each antenna array, and a distance between antenna elements.

Optionally, the access network device 11 may transmit a plurality of beams, for example, may transmit a plurality of beams based on a transmit power that can be supported by hardware, and an EIRP of the spatial grid $X_n$ is controlled to not exceed $E_n$ by controlling a structure of an antenna for transmitting the plurality of beams.

For example, the processor 1111 of the access network device 11 may indicate to change a structure of the antenna 1115, so as to adjust an antenna gain of the plurality of beams in $X_n$.

Application Manner 3

The total mapping power and the antenna gain of the spatial grid $X_n$ may be controlled, so that the total EIRP of the spatial grid $X_n$ does not exceed $E_n$.

In the application manner 3, both the total mapping power and the antenna gain of the spatial grid $X_n$ may be controlled, provided that the total EIRP of the spatial grid $X_n$ obtained based on the total mapping power and the antenna gain of the spatial grid $X_n$ does not exceed $E_n$. In this embodiment of this application, values of the total mapping power and the antenna gain of the spatial grid $X_n$ are not limited, or adjustment ratios of the total mapping power and the antenna gain of the spatial grid $X_n$ are not limited. For how to control the total mapping power and the antenna gain of the grid $X_n$, refer to content in the application manner 1 and the application manner 2.

The total EIRP of the spatial grid $X_n$ is controlled to be less than or equal to $E_n$. Because there is a relationship, for example, a direct proportion relationship, between the total EIRP of the spatial grid $X_n$ and an electric field strength of the spatial grid $X_n$, the electric field strength of the spatial grid $X_n$ may satisfy the local EMF requirement.

Optionally, step S302 may be performed by the processor 1111 in the access network device 11. The memory 1112 may store data that appears when the processor 1111 performs S302, for example, the instantaneous total mapping power or the average total mapping power.

Optionally, the method in FIG. 3 may further include: transmitting the plurality of beams. For example, this step may be performed by the transceiver 1113 and/or the antenna 1115 in the access network device 11.

Figure 5:
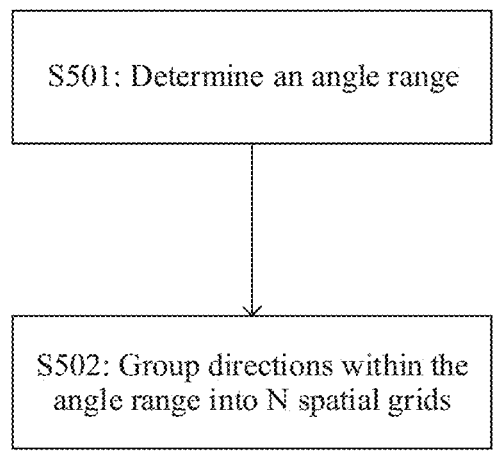
FIG. 5 is a schematic diagram of a spatial grid determining method.

Before S301 in FIG. 3, the access network device 11 may determine several spatial grids. FIG. 5 is a schematic diagram of a spatial grid determining method. The following further describes, with reference to FIG. 5, how to determine a spatial grid. The method in FIG. 5 may be performed by the access network device 11 or a chip in the access network device 11.

S501: Determine an angle range.

n is any integer from 0 to N−1, N is a quantity of spatial grids, and N is greater than or equal to 1.

Optionally, the angle range herein may include a horizontal plane angle range and/or a vertical plane angle range.

Optionally, the access network device 11 may group spatial directions included in a horizontal plane angle range and a vertical plane angle range into N spatial grids, where the horizontal plane angle range may be 0 to 360 degrees, or may be a part of the horizontal plane angle range from 0 to 360 degrees, and the vertical plane angle range may be 0 to 360 degrees, or may be a part of the vertical plane angle range from 0 to 360 degrees.

In an application manner 1, the horizontal plane angle range may be 0 to 360 degrees, and the vertical plane angle range may be 0 to 360 degrees.

In an application manner 2, the horizontal plane angle range and the vertical plane angle range may be a horizontal plane angle range and a vertical plane angle range that include a spatial direction in which an EMF strength needs to be controlled.

The following examples are provided to describe how to determine the horizontal plane angle range and the vertical plane angle range that include a spatial direction in which an EMF strength needs to controlled.

Implementation 1

After a structure of an antenna is determined, an antenna gain in each spatial direction may be simulated. The access network device 11 may determine that an EMF strength needs to be controlled in a spatial direction in which an antenna gain satisfies a condition. For example, the condition may be that the antenna gain exceeds a threshold.

After an antenna gain in a spatial direction exceeds the threshold, when a power is not controlled, an EMF strength at a position that is in the spatial direction and that satisfies a safety distance required by an operator may be relatively high. However, when an antenna gain corresponding to a horizontal plane angle and a vertical plane angle does not exceed the threshold, even when a power in a spatial direction corresponding to the horizontal plane angle and the vertical plane angle is not controlled, where the power is, for example, an ideal power, for example, 200 w, an EMF strength at a position that is in the spatial direction and that satisfies the safety distance required by the operator does not exceed an EMF strength threshold.

A horizontal plane angle range and a vertical plane angle range that include a spatial direction in which an antenna gain satisfies the condition are determined, so that an angle range of a spatial grid can be narrowed down, and algorithm complexity can be reduced.

Figure 6A:
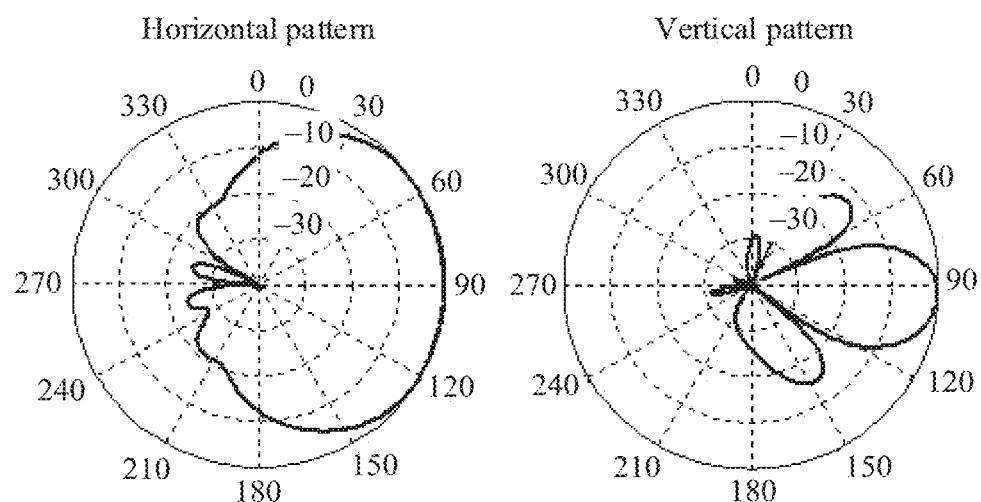
FIG. 6a is a schematic diagram of horizontal plane antenna gains and vertical plane antenna gains.

The following describes an implementation of antenna gains with reference to FIG. 6a. It should be noted that, during implementation, antenna gains in spatial directions may be represented by using values, a table, a graph, or the like, and content in FIG. 6a constitutes no limitation.

FIG. 6a is a schematic diagram of horizontal plane antenna gains and vertical plane antenna gains. A schematic diagram on the left side in FIG. 6a may represent antenna gains on a horizontal plane, and a schematic diagram on the right side in FIG. 6a may represent antenna gains on a vertical plane.

As shown in the diagram on the left side in FIG. 6a, an angular coordinate represents a horizontal plane angle, for example, 0 degrees, 30 degrees, or 60 degrees. A concentric circle indicates a difference from a maximum antenna gain. For example, if the maximum antenna gain is 24 dBi, concentric circles from inside to outside respectively indicate: 30 dB smaller than the maximum antenna gain, 20 dB smaller than the maximum antenna gain, 10 dB smaller than the maximum antenna gain, and equal to the maximum antenna gain, that is, the concentric circles from inside to outside respectively indicate antenna gains −6 dBi, 4 dBi, 14 dBi, and 24 dBi. A black thick line represents an envelope of the antenna gains on the horizontal plane, and each point on a solid line corresponds to an angle and an antenna gain on the horizontal plane. For example, an antenna gain corresponding to a horizontal plane angle of 90 degrees is 24 dBi.

As shown in the diagram on the right side in FIG. 6a, an angular coordinate represents a vertical plane angle, for example, 0 degrees, 30 degrees, or 60 degrees. A concentric circle indicates a difference from a maximum antenna gain. For example, if the maximum antenna gain is 24 dBi, concentric circles from inside to outside respectively indicate: 30 dB smaller than the maximum antenna gain, 20 dB smaller than the maximum antenna gain, 10 dB smaller than the maximum antenna gain, and equal to the maximum antenna gain, that is, the concentric circles from inside to outside respectively indicate antenna gains 6 dBi, 4 dBi, 14 dBi, and 24 dBi. A black thick line represents an envelope of the antenna gains on the vertical plane, and each point on a solid line corresponds to an angle and an antenna gain on the vertical plane. For example, an antenna gain corresponding to a vertical plane angle of 90 degrees is 24 dBi.

It can be learned from the two diagrams in FIG. 6a that, within a horizontal plane angle range and a vertical plane angle range, an antenna gain may reach a threshold, for example, 24 dBi. For example, the access network device 11 may determine that an antenna gain in a spatial direction included in a horizontal plane angle range from 35 degrees to 155 degrees and a vertical plane angle range from 75 degrees to 205 degrees is close to 24 dBi. In this case, the horizontal plane angle range from 35 degrees to 155 degrees and the vertical plane angle range from 75 degrees to 205 degrees are the horizontal plane angle range and the vertical plane angle range that include a spatial direction in which an EMF strength needs to be controlled.

Implementation 2

A horizontal plane angle range and a vertical plane angle range that include a spatial direction in which an EIRP strength needs to be controlled may be obtained based on a geographical environment of the access network device 11. For example, the access network device 11 may receive, from an operator, the horizontal plane angle range and the vertical plane angle range that include a spatial direction in which an EIRP strength needs to be controlled.

For example, it may be determined that in a spatial direction in which there may be a person, for example, in a direction from an antenna to the sky, there is a relatively low probability that an organism appears. Even if an organism such as an airplane appears, a distance between the organism and the antenna is relatively long, and an EIRP strength at a position of the organism is safe. Alternatively, it may be determined that in some spatial directions, a distance between a position at which an organism appears and an antenna is less than a threshold, and EIRP strengths in these spatial directions need to be controlled. Alternatively, the horizontal plane angle range and the vertical plane angle range that include a spatial direction in which an EIRP strength needs to be controlled may be calculated based on an ideal power and an ideal antenna gain of the access network device 11.

In addition, the horizontal plane angle range and the vertical plane angle range that include a spatial direction in which an EIRP strength needs to be controlled may be determined with reference to both the implementation 1 and the implementation 2. For example, the horizontal plane angle range and the vertical plane angle range that include a spatial direction in which an EIRP strength needs to be controlled may be determined by Obtaining an intersection or a union of the horizontal plane angle range and the vertical plane angle range that are determined in the implementation 1 and that include a spatial direction in which an EIRP strength needs to be controlled, and the horizontal plane angle range and the vertical plane angle range that are determined in the implementation 2 and that include a spatial direction in which an EIRP strength needs to be controlled.

For example, S501 may be performed by the processor 1111 in the access network device 11.

S502: Group directions within the angle range into N spatial grids.

After a horizontal plane angle range and a vertical plane angle range within which spatial grid division needs to be performed are determined, the access network device 11 may perform the spatial grid division.

Optionally, there may be one or more spatial grids, that is, N may be an integer greater than or equal to 1.

For example, N may be 1. In this case, there is one spatial grid: $X_0$ (n=0). For another example, N may be 2. In this case, there are two spatial grids: $X_0$ (n=0) and $X_1$ (n=1). For another example, N may be an integer greater than or equal to 3. This is not limited in this embodiment of this application.

Optionally, when there are a plurality of spatial grids (that is, N is greater than 1), a plurality of spatial directions included in a spatial grid do not overlap a plurality of spatial directions included in another spatial grid. In other words, any one of a plurality of spatial directions included in a spatial grid may be different from a plurality of spatial directions included in another spatial grid. In this way, a spatial direction may be uniquely grouped into a spatial grid, to facilitate control of an EIRP of the spatial grid.

Optionally, when the spatial grid division is performed, the division may be performed in an even manner or in an uneven manner.

The even manner may be understood as: Lengths of horizontal plane angle ranges of spatial grids are the same, and lengths of vertical plane angle ranges of the spatial grids are the same.

For example, when N is greater than or equal to 2, a horizontal plane angle range of a spatial grid $X_x$ is from $\varphi_x^{min}$ to $\varphi_x^{max}$, a vertical plane angle range of the spatial grid $X_x$ is from $\theta_x^{min}$ to $\theta_x^{max}$, a horizontal plane angle range of a spatial grid $X_x$ is from vertical plane angle range of the spatial grid $X_y$ is from to $\theta_y^{min}$ to $\theta_y^{max}$, $\varphi_x^{max}-\varphi_x^{min}=\varphi_y^{max}-\varphi_y^{min}$, and $\theta_x^{max}-\theta_x^{min}=\theta_y^{max}-\theta_y^{min}$, where x is an integer from 0 to N-1, y is an integer from 0 to N-1, and x is not equal to y.

FIG. 6b is a schematic diagram of even grid division. FIG. 6b shows that spatial directions included in a horizontal plane angle range from 35 degrees to 155 degrees and a vertical plane angle range from 75 degrees to 205 degrees are divided into 6*12=72 spatial grids. As shown in FIG. 6b, a length of a horizontal plane angle range of each spatial grid is 20 dB, and a length of a vertical plane angle range of each spatial grid is 10 dB.

In the even division manner, the spatial grid division may be relatively simply performed by determining a length of a horizontal plane angle range of each spatial grid and a length of a vertical plane angle range of each spatial grid.

The uneven manner may be understood as: Lengths of horizontal plane angle ranges of spatial grids are different, or lengths of vertical plane angle ranges of the spatial grids are different.

For example, when N is greater than or equal to 2, a horizontal plane angle range of a spatial grid $X_x$ is from $\varphi_x^{min}$ $\varphi_x^{max}$, a vertical plane angle range of the spatial grid $X_x$ is from $\theta_x^{min}$ to $\theta_x^{max}$, a horizontal plane angle range of a spatial grid $X_y$ is from $\varphi_y^{min}$ to $\varphi_y^{max}$, a vertical plane angle range of the spatial grid $X_y$ is from $\theta_y^{min}$ to $\theta_y^{max}$, $\varphi_x^{max}-\varphi_x^{min} \neq \varphi_y^{max}-\varphi_y^{min}$, or $\theta_x^{max}-\theta_x^{min} \neq \theta_y^{max}-\theta_y^{min}$, where x is an integer from 0 to N-1, y is an integer from 0 to N-1, and x is not equal to y.

When the spatial grid division is performed, regardless of whether the even division manner or the uneven division manner is used, a difference between antenna gains in two spatial directions of the spatial grid may be less than or equal to a difference threshold. The following provides descriptions.

After the structure of the antenna for transmitting a plurality of beams is determined, an antenna gain in each spatial direction may be determined.

Optionally, antenna gains in a plurality of spatial directions of a spatial grid $X_n$ may satisfy a specific condition. For example, a difference between antenna gains in any two spatial directions of the spatial grid may be less than or equal to the difference threshold.

It may be understood as: Two spatial directions are selected in the spatial grid $X_n$. As shown in FIG. 4, an antenna gain in a spatial direction 1 ($\varphi_n^1$, $\theta_n^1$) is $G_n^1$, an antenna gain in a spatial direction 2 ($\varphi_n^2$, $\theta_n^2$) is $G_n^2$, and a difference between $G_n^1$ and $G_n^2$ is less than or equal to the difference threshold, where $\varphi_n^1$ and $\varphi_n^2$ each are a value from $\varphi_n^{min}$ to $\varphi_n^{max}$, $\theta_n^1$ and $\theta_n^2$ each are a value from $\theta_n^{min}$ to $\theta n^{max}$, and $\varphi_n^1$ is not equal to $\varphi_n^2$, or $\theta_n^1$ is not equal to $\theta_n^2$. For example, the difference threshold is 3 dB.

The difference between the antenna gains in any two spatial directions of the spatial grid is controlled to be not excessively large. Therefore, antenna gains in all spatial directions of the spatial grid may be relatively close, so that an EIRP of the plurality of beams in the spatial grid is controlled by controlling a total mapping power of the plurality of beams in the spatial grid.

In addition, in the uneven manner, the difference between the antenna gains in any two spatial directions of the spatial grid is enabled to be less than or equal to the difference threshold, so that a quantity of spatial grids is enabled to be as small as possible when the EIRP of the spatial grid is controlled, thereby reducing algorithm complexity.

Optionally, S501 may be performed by the processor 1111 in the access network device 11, and the memory 1112 may store horizontal plane angle ranges and vertical plane angle ranges of the N spatial grids.

It should be noted that FIG. 5 is merely an implementation. In practice, the access network device 11 may not first determine the angle range and then divide the angle range into several grids, but the access network device 11 may directly determine several spatial grids, for example, the access network device 11 obtains, from the operator or a certain organization, one or more spatial directions in which an EIRP strength needs to be controlled, and selects a horizontal plane angle range and a vertical plane angle range near the one or more spatial directions, to determine the several spatial grids.

Figure 7A:
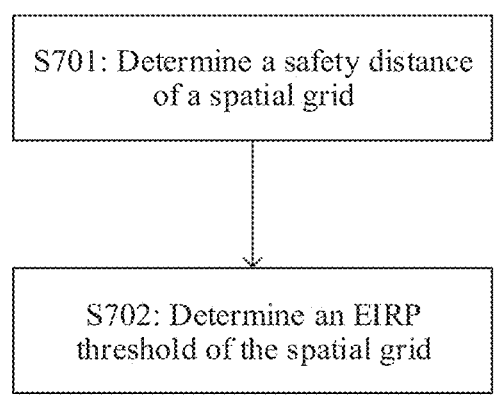
FIG. 7a is a schematic diagram of a method for determining an EIRP threshold of a spatial grid.

How to perform spatial grid division is described above with reference to FIG. 5, FIG. 6a, and FIG. 6b. After the spatial grid division is completed, an EIRP threshold of each spatial grid may be determined. FIG. 7a is a schematic diagram of a method for determining an EIRP threshold of a spatial grid. Mutual reference may be made to content of the method and content in S301. As shown in FIG. 7a:

S701: The access network device 11 determines a safety distance of a spatial grid.

For the safety distance of the spatial grid, refer to related content in S301.

In an implementation 1, the access network device 11 may receive the safety distance of the spatial grid from an operator.

In a scenario of a plurality of spatial grids, a safety distance of each spatial grid may be received, and safety distances of the spatial grids may be the same or different. Alternatively, only one safety distance may be received, and each spatial grid needs to satisfy the safety distance. For example, the operator may select a smallest safety distance from the safety distances of the spatial grids, and send the smallest safety distance to the access network device 11.

For example, the processor 1111 receives the safety distance of the spatial grid via the network interface 1114.

In an implementation 2, the access network device 11 may receive, from the operator, a distribution status of a building in the spatial grid, to determine the safety distance of the spatial grid. For example, the operator may first determine a position of the building in the spatial grid, for example, longitude and latitude of the building, or use a spatial coordinate system to indicate a position of the building; and the operator may send the position of the building in the spatial grid to the access network device 11. Then, the access network device 11 may calculate the safety distance of the spatial grid based on the position of the building in the spatial grid.

For example, the processor 1111 receives the distribution status of the building in the spatial grid via the network interface 1114, and then the processor 1111 may calculate the safety distance of the spatial grid based on the position of the building in the spatial grid.

In the implementation 1 and the implementation 2, the access network device 11 may obtain a horizontal safety distance and a vertical safety distance of the spatial grid from the operator, and then obtain the safety distance of the spatial grid based on the horizontal safety distance and the vertical safety distance of the spatial grid.

The horizontal safety distance may be a projection of the safety distance of the spatial grid on a horizontal plane, and the vertical safety distance may be a projection of the safety distance of the spatial grid on a vertical plane.

For example, the operator may determine that the horizontal safety distance is A and the vertical safety distance is B. Each spatial grid needs to satisfy an EMT strength limitation corresponding to the horizontal safety distance A and the vertical safety distance B.

Figure 7B:
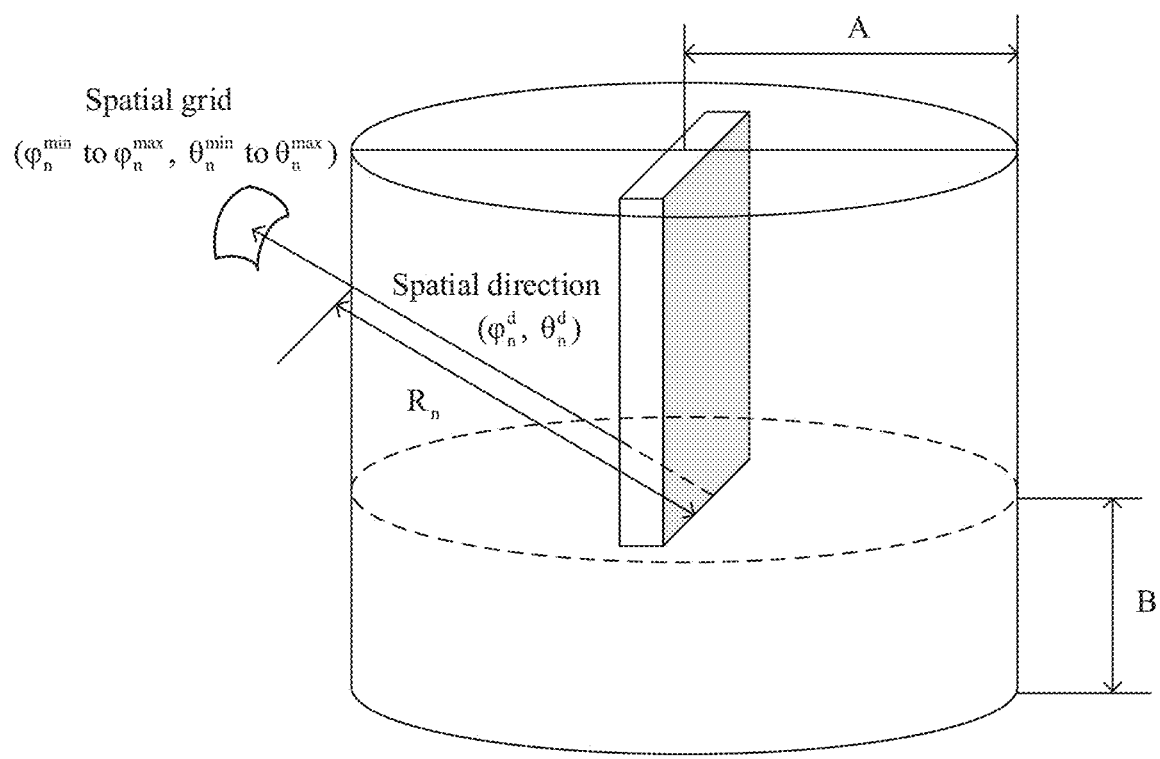
FIG. 7b is a schematic diagram of a horizontal safety distance and a vertical safety distance.

FIG. 7b is a schematic diagram of a horizontal safety distance and a vertical safety distance. In FIG. 7b, a bottom end of an antenna is used as an origin of a coordinate system. As shown in FIG. 7b, it is assumed that an EMF strength does not need to be controlled above the antenna, and a cylinder is drawn based on A and B, where a radius of the cylinder is A, a height of the cylinder is C+B, and C is a height of the antenna.

Optionally, a distance between the bottom end of the antenna and an intersection point of a spatial direction in a spatial grid and a surface of the cylinder is a safety distance of the spatial grid.

For example, a horizontal plane angle range of a spatial grid $X_n$ is from $\varphi_n^{min}$ to $\varphi_n^{max}$, a vertical plane angle range of the spatial grid $X_n$ is from $\theta_n^{min}$ to $\theta_n^{max}$, and a safety distance $R_n$ of the spatial grid $X_n$ may be a safety distance corresponding to a horizontal plane angle $\varphi_n^d$ and a vertical plane angle $\theta_n^d$, where $\varphi_n^d$ is a value from $\varphi_n^{min}$ to $\varphi_n^{max}$, and $\theta_n^d$ is a value from $\theta_n^{min}$ to $\theta_n^{max}$. As shown in FIG. 7b, $R_n$ is a distance between the bottom end of the antenna and an intersection point of $(\varphi_n^d, \theta_n^d)$ and the surface of the cylinder.

Optionally, when there are a plurality of spatial grids, a distance between the bottom end of the antenna and an intersection point of a spatial direction in each spatial grid and the surface of the cylinder may be separately determined.

S702: The access network device 11 determines an equivalent isotropically radiated power EIRP threshold of the spatial grid.

For example, the access network device 11 may calculate an EIRP threshold $E_n$ of the spatial grid $X_n$ according to the foregoing formula 5: $E_n = a*S^b*R_n^c$ (formula 5), where $R_n$ is a safety distance of the spatial grid $X_n$, S is an EMF strength threshold, and a, b, and c are positive numbers. For example, a is $4\pi$, b is 1, and c is 2.

Optionally, the processor 1111 may perform calculation according to the foregoing formula 5.

Optionally, in addition to the implementations in S701 and S702, the access network device 11 may directly obtain the equivalent isotropically radiated power EIRP threshold of the spatial grid from the operator, or another manner of obtaining the equivalent isotropically radiated power EIRP threshold of the spatial grid is used. This is not limited in this embodiment of this application.

Optionally, after a spatial grid is determined, for example, after S502, whether EIRP control needs to be performed in the spatial grid may be determined. When EIRP control needs to be performed in the spatial grid, EIRP control is performed in the spatial grid; when EIRP control does not need to be performed in the spatial grid, EIRP control may not be performed. Therefore, the access network device 11 may transmit a beam based on an ideal power and an ideal antenna gain. This can ensure performance of the access network device 11.

Figure 8:
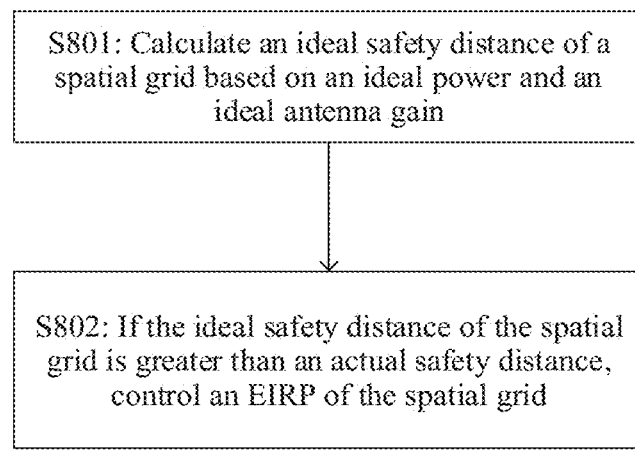
FIG. 8 is a schematic diagram of determining whether EIRP control needs to be performed in a spatial grid.

The following describes how to determine whether EIRP control needs to be performed in a spatial grid. FIG. 8 is a schematic diagram of determining whether EIRP control needs to be performed in a spatial grid. It should be noted that the solution in FIG. 8 is optional, and the access network device 11 may directly perform EIRP control in the spatial grid without performing the determining step in FIG. 8.

S801: Calculate an ideal safety distance of the spatial grid based on an ideal power and an ideal antenna gain.

The ideal power herein may be understood as a maximum transmit power of the access network device 11 without power control; or may be understood as a transmit power supported by hardware of the access network device 11; or may be understood as a transmit power that is expected to be used by the access network device 11 without considering an EMF strength.

The ideal antenna gain herein may be understood as a maximum antenna gain that can be supported by an antenna when the access network device 11 does not control an antenna gain; or may be understood as an antenna gain supported by the hardware of the access network device 11; or may be understood as an antenna gain that is expected to be used by the access network device 11 without considering an EMF strength.

For example, the ideal power of the access network device 11 is 200 w, and the ideal antenna gain of the access network device 11 is an antenna gain of a structure of the antenna.

Optionally, the ideal safety distance of the spatial grid may be a distance from the antenna in a spatial direction of the spatial grid.

Optionally, R may be calculated according to the foregoing formula:

$$R = \sqrt{\frac{P*G}{4\pi S}}, \quad \text{(formula 2)}$$

where S is a power spectral density requirement, P is an input power of an antenna port, and G is an antenna gain.

Optionally, the processor 1111 may perform S801.

S802: If the ideal safety distance of the spatial grid is greater than an actual safety distance, control a total EIRP of the spatial grid.

Herein, the actual safety distance of the spatial grid may be understood as a safety distance that needs to be satisfied in the spatial grid based on a requirement of an operator and/or a certain organization. For the actual safety distance of the spatial grid, refer to related content in S301 and S701. It should be noted that, to distinguish from the ideal safety distance of the spatial grid herein, the term "actual safety distance of the spatial grid" is used for description herein.

The access network device 11 may compare values of the ideal safety distance and the actual safety distance of the spatial grid. When the ideal safety distance of the spatial grid is less than or equal to the actual safety distance of the spatial grid, it indicates that when the access network device 11 transmits the beam based on the ideal power and the ideal antenna gain, an EMF strength that is in the spatial grid and that is at a position that satisfies the actual safety distance does not exceed an EMF strength threshold. In this case, the EIRP of the spatial grid does not need to be limited. When the ideal safety distance of the spatial grid is greater than the actual safety distance of the spatial grid, it indicates that when the access network device 11 transmits the beam based on the ideal power and the ideal antenna gain, an EMF strength that is in the spatial grid and that is at a position that satisfies the actual safety distance exceeds the EMF strength threshold. In this case, the EIRP of the spatial grid needs to be limited.

In an implementation 1, the access network device 11 may compare the ideal safety distance of the spatial grid with the actual safety distance of the spatial grid.

In an implementation 2, the access network device 11 may obtain an ideal horizontal safety distance of the spatial grid $X_n$ and an ideal vertical safety distance of the spatial grid based on the ideal safety distance of the spatial grid, and then compare the ideal horizontal safety distance of the spatial grid with an actual horizontal safety distance of the spatial grid and compare the ideal vertical safety distance of the spatial grid with an actual vertical safety distance of the spatial grid. When the ideal horizontal safety distance of the spatial grid $X_n$ is greater than the actual horizontal safety distance of the spatial grid, and the ideal vertical safety distance of the spatial grid is greater than the actual vertical safety distance of the spatial grid, the EIRP of the spatial grid is controlled. In this case, in S701, after receiving the actual horizontal safety distance and the actual vertical safety distance for deploying the access network device, the access network device 11 may not determine the actual safety distance of the spatial grid, and may first compare the ideal horizontal safety distance of the spatial grid with the actual horizontal safety distance of the spatial grid and compare the ideal vertical safety distance of the spatial grid with the actual vertical safety distance of the spatial grid. When the EIRP of the spatial grid needs to be controlled, the access network device 11 determines the actual safety distance of the spatial grid based on S701.

For example, in FIG. 7b, the access network device 11 may determine whether the ideal safety distance of the spatial grid falls outside the cylinder, for example, may determine whether the ideal safety distance of the spatial grid is greater than a distance between the bottom end of the antenna and an intersection point of a spatial direction in the spatial grid and the surface of the cylinder, or may determine whether the horizontal safety distance of the spatial grid is greater than A and whether the vertical safety distance of the spatial grid is greater than B.

Figure 9:
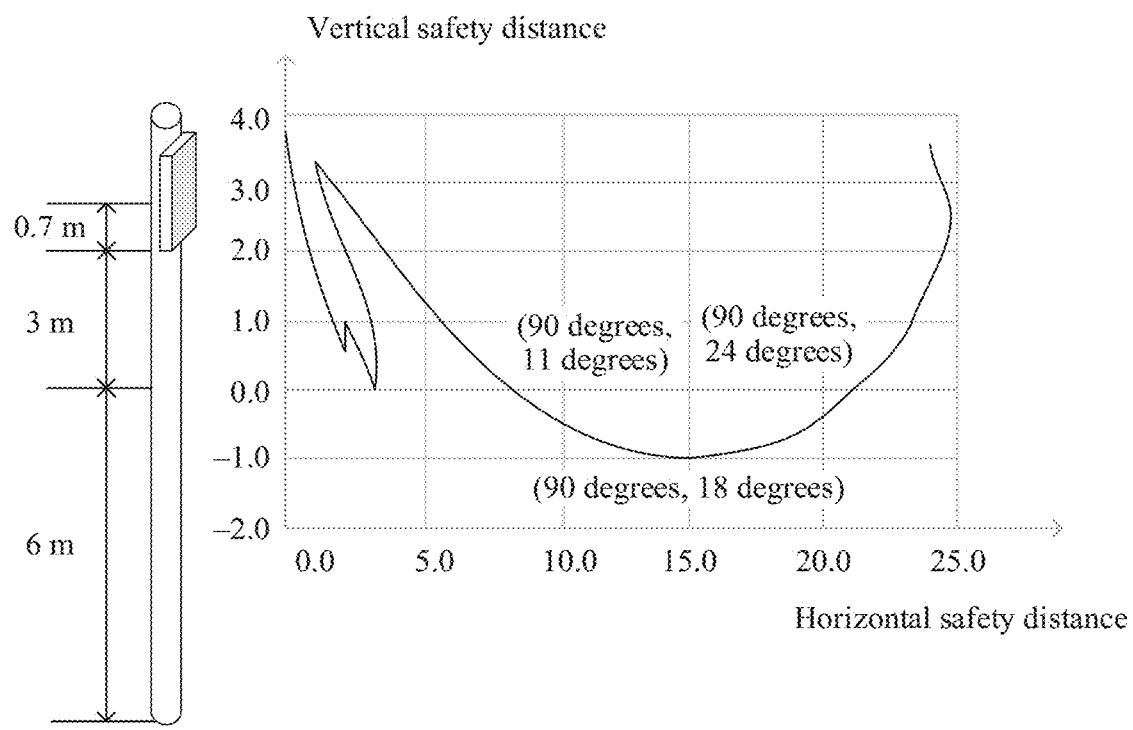
FIG. 9 is a schematic diagram of an ideal safety distance.

For example, FIG. 9 is a schematic diagram of an ideal safety distance. As shown in FIG. 9, a horizontal axis represents horizontal safety distances, a vertical axis represents vertical safety distances, a start point of the horizontal axis is a horizontal position of an antenna, and a start point of the vertical axis is a position of a rooftop. On a curve in the coordinate system, each point may represent a spatial direction (for example, a horizontal plane angle of each spatial direction is 90 degrees, and a vertical plane angle of each spatial direction is different), and each spatial direction corresponds to an ideal horizontal safety distance and an ideal vertical safety distance.

It is assumed that an operator requires an actual horizontal safety distance of 30 m and an actual vertical safety distance of 3.7 m (because a distance between the rooftop and the antenna is 3.7 m). In this case, an ideal vertical safety distance in a spatial direction included in a horizontal plane angle of 90 degrees and a vertical plane angle range from 11 degrees to 24 degrees exceeds 3.7 m, for example, an ideal vertical safety distance reaches 4.7 m in a spatial direction corresponding to a horizontal plane angle of 90 degrees and a vertical plane angle of 18 degrees. Therefore, EIRP control needs to be performed in a spatial grid included in spatial directions corresponding to the horizontal plane angle of 90 degrees and the vertical plane angle range from 11 degrees to 24 degrees. For example, EIRP control is performed in the spatial grid based on the actual vertical safety distance of 3.7 m.

S802 may be performed by the processor 1111.

The following describes how to obtain the total mapping power of the plurality of beams in the spatial grid in S302.

Figures 10, 11:
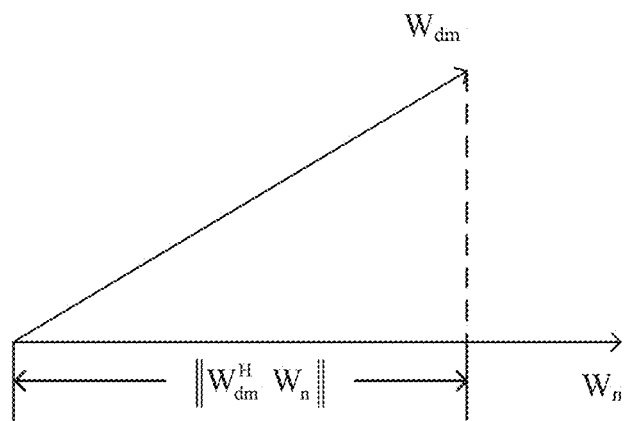
FIG. 10 is a schematic diagram of a plurality of beams.
FIG. 11 is a schematic diagram of a mapping power of a beam m in a spatial grid $X_n$.

FIG. 10 is a schematic diagram of a plurality of beams. As shown in FIG. 10, it is assumed that there are a total of R RBGs in a time-frequency resource, and there may be $M_r$ beams (for example, the beams may respectively cover $M_r$ terminals, and may be referred to as $M_r$ streams) in $RBG_r$, where r is an integer from 0 to R−1, and quantities of beams in the RBGs may be different, that is, two of $M_0, M_2, \ldots,$ and $M_r$ may be the same or different.

FIG. 11 is a schematic diagram of a mapping power of a beam m in a spatial grid $X_n$. The beam m is a beam of the plurality of beams. As shown in FIG. 11, a projection of $W_{dm}$ on $W_n$ may be represented as $\|W_{dm}{}^H W_n\|$, and the mapping power of the beam m in the spatial grid $X_n$ may be represented as $\|W_{dm}{}^H W_n\|^2$, where $W_{dm}$ is a weight of the beam m, $W_{dm}$ is a vector of K*1, $W_{dm}{}^H$ is a transpose of $W_{dm}$, $W_n$ is a weight of the spatial grid $X_n$, and $W_n$ is a vector of K*1.

A mapping power of each of the plurality of beams in the spatial grid $X_n$ may be obtained, and then the total mapping power of the plurality of beams in the spatial grid $X_n$ is obtained based on the mapping power of each beam in the spatial grid $X_n$. For example, a sum of mapping powers of the beams in the spatial grid $X_n$ is calculated, to obtain the total mapping power of the plurality of beams in the spatial grid $X_n$. It should be noted that another manner, such as a weighted summation manner, may be used to obtain the mapping power of the plurality of beams in the spatial grid $X_n$ based on the mapping power of each beam in the spatial grid $X_n$. This is not limited in this embodiment of this application. For example, the total mapping power of the plurality of beams in the spatial grid $X_n$ may be represented by using the following formula:

$$P_n \Sigma_{r=1}^{R} \Sigma_{m=1}^{M} \|W_{dm}{}^H W_n\|^2 \qquad \text{(formula 7)}.$$

$P_n$ is the total mapping power of the plurality of beams in the spatial grid $X_n$, $W_{dm}$ is a weight of the beam m, $W_{dm}$ is a vector of K*1, $W_{dm}^H$ is a transpose of $W_{dm}$, m is an integer from 0 to M−1, M is a quantity of beams in one RBG, R is a quantity of RBGs, $W_n$ is a weight of the spatial grid $X_n$, and $W_n$ is a vector of K*1. Optionally, normalization may be further performed based on the foregoing formula 7, to obtain the following formula:

$$P_n = \frac{\sum_{r=1}^{R} \sum_{m=1}^{M} \|W_{dm}^H W_n\|^2}{\sum_{r=1}^{R} \|W_n^H W_n\|^2}. \qquad \text{(formula 8)}$$

In addition, the formula 7 and the formula 8 may alternatively have other variations. This is not limited in this embodiment of this application.

A MIMO beam is different from a conventional beam. In a conventional technology, a relatively wide beam is formed in space, energy is relatively centralized, and a power in each spatial direction is the same. For example, the power in each spatial direction may be a maximum power. However, in a MIMO technology, several slender beams may be formed in space, energy is not centralized, and a power of each beam cannot reach a maximum power. For example, the maximum power may be evenly distributed to M*N beams. In addition, directions of the plurality of beams are different, there is a specific angle between a direction of a maximum power of each beam and the spatial grid $X_n$, and the mapping power of each beam in the spatial grid $X_n$ may be less than the maximum power of each beam. Consequently, the mapping power of the plurality of beams in the spatial grid $X_n$ cannot reach a maximum power of the access network device 11. Considering a feature of the MIMO beam, a mapping power of the spatial grid $X_n$ can be relatively objectively estimated based on the mapping power of the plurality of beams in the spatial grid $X_n$.

Figure 12:
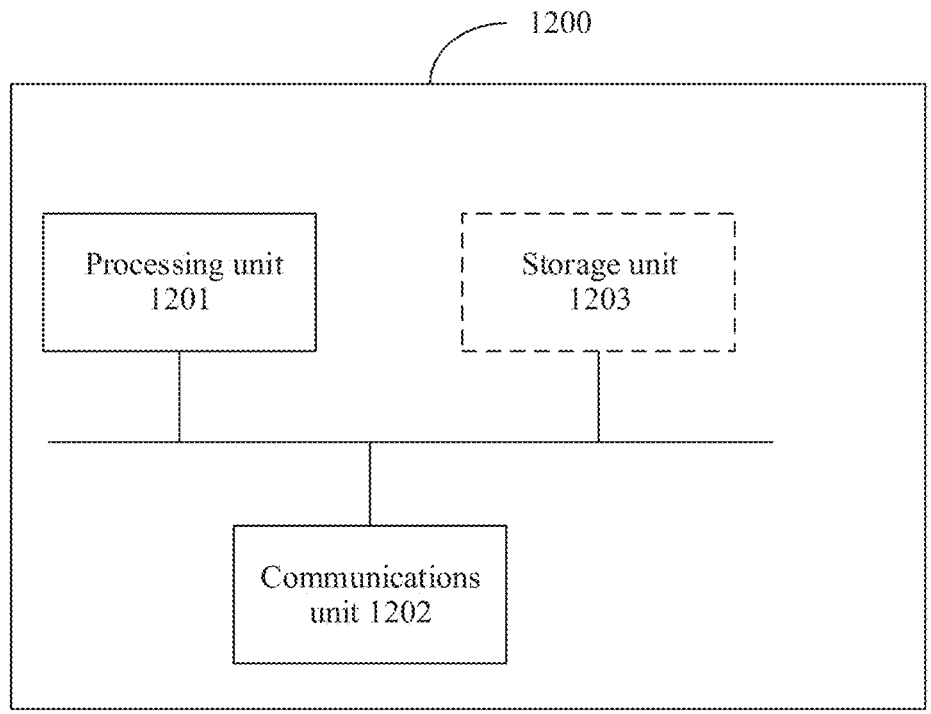
FIG. 12 is a schematic diagram of a communications apparatus 1200.

The foregoing describes the method provided in the embodiments of this application. The following describes a communications apparatus 1200 provided in the embodiments of this application. FIG. 12 is a schematic diagram of the communications apparatus 1200. As shown in FIG. 12:

The communications apparatus 1200 includes a processing unit 1201 and a communications unit 1202. Optionally, the communications apparatus 1200 further includes a storage unit 1203. The processing unit 1201, the communications unit 1202, and the storage unit 1203 are connected via a communications bus.

The processing unit 1201 may be a unit having a processing function, and is configured to control the communications apparatus 1200 to perform a method or an action. The processing unit 1201 may include one or more processors.

The storage unit 1203 may be a unit having a storage function. For example, the storage unit 1203 may include one or more memories, and the memory may be a component configured to store a program or data in one or more devices or circuits.

The storage unit 1203 may exist independently, and is connected to the processing unit 1201 via the communications bus. The storage unit may alternatively be integrated with the processing unit 1201.

The communications unit 1202 may be a unit having a transceiver function, and is configured to communicate with another communications device.

The communications apparatus 1200 may be used in a communications device, a circuit, a hardware assembly, or a chip.

The communications apparatus 1200 may be the access network device in the embodiments of this application, for example, the access network device 11. A schematic diagram of the access network device 11 may be shown in FIG. 2. Optionally, the communications unit 1202 of the apparatus 1200 may include an antenna and a transceiver, for example, the antenna 1115 and the transceiver 1113 in FIG. 2. Optionally, the communications unit 1202 of the apparatus 1200 may include a network interface, for example, the network interface 1112 in FIG. 2.

The communications apparatus 1200 may be a chip in the access network device in the embodiments of this application, for example, a chip in the access network device 11. The communications unit 1202 may be an input or output interface, a pin, a circuit, or the like. Optionally, the storage unit may store computer-executable instructions of a method on an access network device side, so that the processing unit 1201 performs the method performed by the access network device 11 in the foregoing embodiments. The storage unit 1203 may be a register, a cache, a RAM, or the like, and the storage unit 1203 may be integrated with the processing unit 1201. The storage unit 1203 may be a ROM or another type of static storage device that can store static information and instructions, and the storage unit 1203 may be independent of the processing unit 1201. Optionally, with development of wireless communications technologies, a transceiver may be integrated into the communications apparatus 1200. For example, a transceiver is integrated into the communications unit 1202.

When the communications apparatus 1200 is the access network device or the chip in the access network device in the embodiments of this application, the communications apparatus 1200 may perform the method performed by the access network device, for example, the method performed by the access network device 11.

The processing unit 1201 may perform related actions such as calculation, determining, and obtaining in the method performed by the access network device 11. The storage unit 1203 may perform an action of storing data and/or instructions in the method performed by the access network device 11. The communications unit 1202 may perform an action of sending and/or receiving data, an action of interacting with another communications device, an action of interacting with another unit in the access network device 11, and the like in the method performed by the access network device 11.

For example, the processing unit 1201 may determine an EIRP threshold $E_n$ of a spatial grid $X_n$, and control a total EIRP of a plurality of beams in the spatial grid $X_n$, so that the total EIRP is less than or equal to the EIRP threshold $E_n$. Optionally, when the communications apparatus 1200 is the access network device 11, the communications unit 1202 transmits a plurality of beams; when the communications apparatus 1200 is the chip in the access network device, the communications unit 1202 may indicate the transceiver and/or the antenna to transmit a plurality of beams, for example, the communications unit 1202 may send data of the plurality of beams to the transceiver and/or the antenna, and the transceiver and/or the antenna transmit/transmits the plurality of beams based on the data of the plurality of beams.

For example, the processing unit 1201 may determine a safety distance $R_n$ of the spatial grid $X_n$, and determine the EIRP threshold $E_n$ of the spatial grid $X_n$ based on the safety distance $R_n$ of the spatial grid $X_n$.

For example, the processing unit 1201 may determine a horizontal plane angle range and a vertical plane angle range of the spatial grid $X_n$.

For example, the processing unit 1201 may perform division into one or more spatial grids.

For example, the processing unit 1201 may control a total mapping power of the plurality of beams in the spatial grid $X_n$ and/or an antenna gain of the spatial grid $X_n$, so that the total EIRP of the spatial grid $X_n$ does not exceed the EIRP threshold $E_n$.

For example, the processing unit 1201 may obtain the total mapping power of the plurality of beams in the spatial grid $X_n$.

For example, the processing unit 1201 may control a power of at least one of the plurality of beams, for example, control the power of the at least one beam in a manner such as controlling a weight of the at least one beam.

For example, the processing unit 1201 may further control the antenna gain of the spatial grid $X_n$. For example, the processing unit 1201 may control a structure of an antenna, for example, the processing unit 1201 may indicate to adjust the structure of the antenna, to control the antenna gain of the spatial grid $X_n$.

The processing unit 1201, the communications unit 1202, and the storage unit 1203 may perform other actions in the method performed by the access network device 11. For details, refer to the foregoing method.

Figure 13:
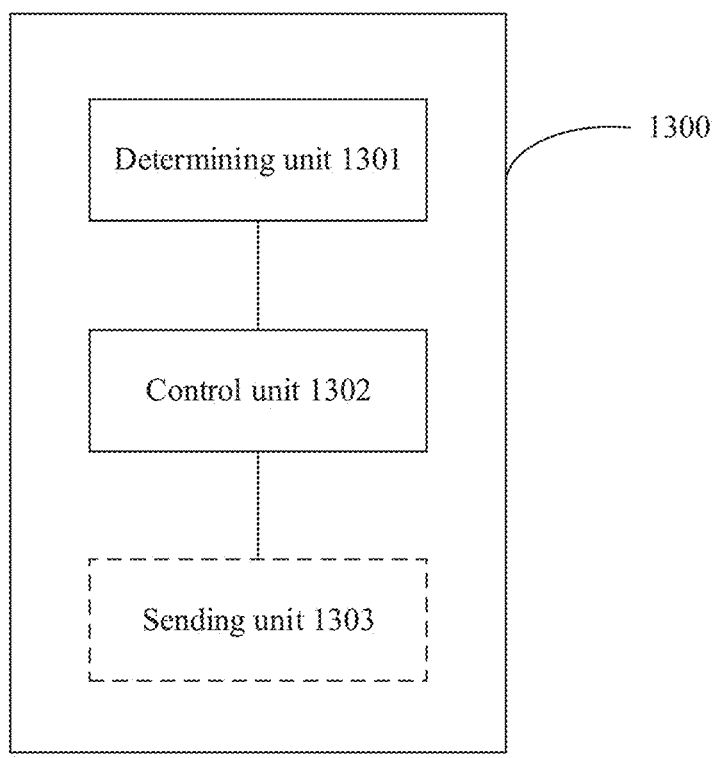
FIG. 13 is a schematic diagram of a communications apparatus 1300.

FIG. 13 is a schematic diagram of another communications apparatus 1300 according to an embodiment of this application. As shown in FIG. 13, the communications apparatus 1300 may include a determining unit 1301 and a control unit 1302.

The determining unit 1301 is configured to determine an EIRP threshold $E_n$ of a spatial grid $X_n$, where the EIRP threshold $E_n$ is related to a safety distance $R_n$ of the spatial grid $X_n$, n is any integer from 0 to N−1, N is a quantity of spatial grids, and N is a positive integer greater than or equal to 1.

The control unit 1302 is configured to control a total EIRP of a plurality of beams in the spatial grid $X_n$, so that the total EIRP is less than or equal to the EIRP threshold $E_n$.

Optionally, the control unit 1302 is further configured to control a total mapping power of the plurality of beams in the spatial grid $X_n$, so that the total EIRP of the spatial grid $X_n$ does not exceed the EIRP threshold $E_n$ and $G_n$.

Optionally, the determining unit 1301 may be configured to determine an antenna gain $G_n$ of $X_n$; and the control unit 1302 may be configured to control the total mapping power of the plurality of beams in the spatial grid $X_n$ to be less than or equal to a power threshold $P_n$, where $P_n$ is obtained based on $E_n$ and $G_n$.

Optionally, the control unit 1302 may be configured to control a power of at least one of the plurality of beams to be less than a beam power threshold, so that the total mapping power of the plurality of beams in the spatial grid $X_n$ is less than or equal to $P_n$.

Optionally, the control unit 1302 may be configured to: control the antenna gain of the plurality of beams in $X_n$, so that the EIRP of $X_n$ does not exceed $E_n$; or control the antenna gain and the power of the plurality of beams in $X_n$, so that the EIRP of $X_n$ does not exceed $E_n$.

Optionally, the communications apparatus 1300 may further include a sending unit 1303, and the sending unit 1303 is configured to send the total mapping power of the plurality of beams in the spatial grid $X_n$ to a network management system.

The communications apparatus 1300 may perform another step in the foregoing method, and reference may be made to content in FIG. 3 to FIG. 11.

The foregoing method relates to a terminal, and may be performed by a module or a unit in the terminal. The terminal may have a module or a unit corresponding to the method. Alternatively, a memory in the terminal may store computer instructions and data, and a processor may execute the computer instructions and the data to perform the foregoing method.

In addition, the method in the embodiments of this application may be performed by one or more modules or units, and one or more of the modules or units may be implemented by using software, hardware, or a combination thereof.

When any one of the modules or units is implemented by using software, the software exists in a form of computer program instructions, and is stored in a memory. A processor may be configured to execute the program instructions to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form an SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

When the modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

An embodiment of this application further provides a computer-readable storage medium. The method described in the foregoing embodiment may be completely or partially implemented by using software, hardware, firmware, or any combination thereof. If the method is implemented in software, the functions used as one or more instructions or code may be stored or transmitted on the computer-readable medium. The computer-readable medium may include a computer storage medium and a communications medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of instructions or a data structure and that may be accessed by the computer. In addition, any connection is properly referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combination should also be included within the scope of the computer-readable medium.

An embodiment of this application further provides a computer program product. The method described in the foregoing embodiment may be completely or partially implemented by using software, hardware, firmware, or any combination thereof. When the method is implemented in software, the method may be completely or partially implemented in a form of a computer program product. The computer program product includes one or more computer instructions. When the computer program instructions are loaded and executed on a computer, the procedures or functions described in the foregoing method embodiment are completely or partially generated. The foregoing computer may be a general-purpose computer, a dedicated computer, a computer network, a network device, user equipment, or another programmable apparatus.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. An equivalent isotropically radiated power (EIRP) control method, wherein the method comprises:
   determining an EIRP threshold $E_n$ of a spatial grid $X_n$, wherein the EIRP threshold $E_n$ is related to a safety distance $R_n$ of the spatial grid $X_n$, wherein n is any integer from 0 to N−1, wherein N is a quantity of spatial grids, and wherein N is a positive integer greater than or equal to 1; and
   controlling a total EIRP of a plurality of beams in the spatial grid $X_n$ to be less than or equal to the EIRP threshold $E_n$.

2. The method according to claim 1, wherein a relationship among the EIRP threshold $E_n$, the safety distance $R_n$, and an electromagnetic field (EMF) strength threshold S satisfies:

$$E_n = a * S^b * R_n^c, \text{ wherein } a, b, \text{ and } c \text{ are positive numbers.}$$

3. The method according to claim 1, wherein a horizontal plane angle range of the spatial grid $X_n$ is from a minimum horizontal plane angle $\varphi_n^{min}$ to a maximum horizontal plane angle $\varphi_n^{max}$, and wherein a vertical plane angle range of the spatial grid $X_n$ is from a minimum vertical plane angle $\theta_n^{min}$ to a maximum vertical plane angle $\theta_n^{max}$.

4. The method according to claim 3, wherein an antenna gain corresponding to a horizontal plane angle $\varphi_n^1$ and a vertical plane angle $\theta_n^1$ is an antenna gain $G_n^1$, wherein an antenna gain corresponding to a horizontal plane angle $\varphi_n^2$ and a vertical plane angle $\theta_n^2$ is an antenna gain $G_n^2$, wherein a difference between the antenna gain $G_n^1$ and the antenna gain $G_n^2$ is less than or equal to a difference threshold, wherein $\varphi_n^1$ and $\varphi_n^2$ each are a value from $\varphi_n^{min}$ to $\varphi_n^{max}$, wherein $\theta_n^1$ and $\theta_n^2$ each are a value from $\theta_n^{min}$ to $\theta_n^{max}$, and wherein $\varphi_n^1$ is not equal to $\varphi_n^2$, or $\theta_n^1$ is not equal to $\theta_n^2$.

5. The method according to claim 3, wherein the safety distance $R_n$ is a safety distance corresponding to a horizontal plane angle $\varphi_n^d$ and a vertical plane angle $\theta_n^d$, wherein $\varphi_n^d$ is a value from $\varphi_n^{min}$ to $\varphi_n^{max}$, and wherein $\theta_n^d$ is a value from $\theta_n^{min}$ to $\theta_n^{max}$.

6. The method according to claim 1, wherein controlling the total EIRP of the plurality of beams in the spatial grid $X_n$ to be less than or equal to the EIRP threshold $E_n$ comprises:
   controlling the total EIRP of the plurality of beams in the spatial grid $X_n$ to be less than or equal to the EIRP threshold $E_n$, by controlling a total mapping power of the plurality of beams in the spatial grid $X_n$, to be less than or equal to a power threshold $P_n$, wherein $P_n$ is obtained based on the EIRP threshold $E_n$ and antenna gain $G_n$ of the plurality of beams in the spatial grid $X_n$.

7. The method according to claim 6, wherein the total mapping power of the plurality of beams in the spatial grid $X_n$ comprises an instantaneous total mapping power of the plurality of beams in the spatial grid $X_n$.

8. The method according to claim 6, wherein the total mapping power of the plurality of beams in the spatial grid $X_n$ comprises an average total mapping power of the plurality of beams in the spatial grid $X_n$ in a time period T, and wherein the average total mapping power of the plurality of beams in the spatial grid $X_n$ in the time period T is an average value of instantaneous total mapping powers of the plurality of beams in the spatial grid $X_n$ in the time period T.

9. The method according to claim 8, wherein the time period T comprises a moment t1, and wherein an instantaneous total mapping power of the plurality of beams in the spatial grid $X_n$ at the moment t1 is greater than $P_n$.

10. The method according to claim 6, wherein controlling the total mapping power of the plurality of beams in the spatial grid $X_n$ to be less than or equal to a power threshold $P_n$ comprises:

controlling the total mapping power of the plurality of beams in the spatial grid $X_n$ to be less than or equal to $P_n$ by controlling a power of one or more of the plurality of beams to be less than a beam power threshold.

11. A communication apparatus for an access network device, comprising:
   at least one processor; and
   a non-transitory storage medium coupled to the at least one processor and storing executable instructions that, when executed by the at least one processor, cause the apparatus to:
      determine an equivalent isotropically radiated power (EIRP) threshold $E_n$ of a spatial grid $X_n$, wherein the EIRP threshold $E_n$ is related to a safety distance $R_n$ of the spatial grid $X_n$, wherein n is any integer from 0 to N−1, wherein N is a quantity of spatial grids, and wherein N is a positive integer greater than or equal to 1; and
      control a total EIRP of a plurality of beams in the spatial grid $X_n$ to be less than or equal to the EIRP threshold $E_n$.

12. The communication apparatus according to claim 11, wherein a relationship among the EIRP threshold $E_n$, the safety distance $R_n$, and an electromagnetic field (EMF) strength threshold S satisfies:

$E_n = a * S^b * R_n^c$, wherein $a$, $b$, and $c$ are positive numbers.

13. The communication apparatus according to claim 11, wherein a horizontal plane angle range of the spatial grid $X_n$ is from a minimum horizontal plane angle $\varphi_n^{min}$ to a maximum horizontal plane angle $\varphi_n^{max}$, and wherein a vertical plane angle range of the spatial grid $X_n$ is from a minimum vertical plane angle $\theta_n^{min}$ to a maximum vertical plane angle $\theta_n^{max}$.

14. The communication apparatus according to claim 13, wherein an antenna gain corresponding to a horizontal plane angle $\varphi_n^1$ and a vertical plane angle $\theta_n^1$ is an antenna gain $G_n^1$, wherein an antenna gain corresponding to a horizontal plane angle $\varphi_n^2$ and a vertical plane angle $\theta_n^2$ is an antenna gain $G_n^2$, wherein a difference between the antenna gain $G_n^1$ and the antenna gain $G_n^2$ is less than or equal to a difference threshold, wherein $\varphi_n^1$ and $\varphi_n^2$ each are a value from $\varphi_n^{min}$ to $\varphi_n^{max}$, wherein to $\theta_n^1$ and $\theta_n^2$ each are a value from $\theta_n^{min}$ to $\theta_n^{max}$, and wherein $\varphi_n^1$ is not equal to $\varphi_n^2$, $\theta_n^1$ is not equal to $\theta_n^2$.

15. The communication apparatus according to claim 13, wherein the safety distance R is a safety distance corresponding to a horizontal plane angle $\varphi_n^d$ and a vertical plane angle $\theta_n^d$, wherein $\varphi_n^d$ is a value from $\varphi_n^{min}$ to $\varphi_n^{max}$, and wherein $\theta_n^d$ is a value from $\varphi_n^{min}$ to $\varphi_n^{max}$, and wherein $\theta_n^d$ is a value from $\varphi_n^{min}$ to $\varphi_n^{max}$.

16. The communication apparatus according to claim 11, wherein controlling the total EIRP of the plurality of beams in the spatial grid $X_n$ to be less than or equal to the EIRP threshold $E_n$ comprises:
   controlling the total EIRP of the plurality of beams in the spatial grid $X_n$ to be less than or equal to the EIRP threshold $E_n$ by control a total mapping power of the plurality of beams in the spatial grid $X_n$ to be less than or equal to a power threshold $P_n$, wherein $P_n$ is obtained based on the EIRP threshold $E_n$ and antenna gain $G_n$ of the plurality of beams in the spatial grid $X_n$.

17. The communication apparatus according to claim 16, wherein the total mapping power of the plurality of beams in the spatial grid $X_n$ comprises an instantaneous total mapping power of the plurality of beams in the spatial grid $X_n$.

18. The communication apparatus according to claim 16, wherein the total mapping power of the plurality of beams in the spatial grid $X_n$ comprises an average total mapping power of the plurality of beams in the spatial grid $X_n$ in a time period T, and wherein the average total mapping power of the plurality of beams in the spatial grid $X_n$ in the time period T is an average value of instantaneous total mapping powers of the plurality of beams in the spatial grid $X_n$ in the time period T.

19. The communication apparatus according to claim 18, wherein the time period comprises a moment t1, and wherein an instantaneous total mapping power of the plurality of beams in the spatial grid $X_n$ at the moment t1 is greater than $P_n$.

20. The communication apparatus according to claim 16, wherein controlling the total mapping power of the plurality of beams in the spatial grid $X_n$ to be less than or equal to a power threshold $P_n$ comprises:
   controlling the total mapping power of the plurality of beams in the spatial grid $X_n$ to be less than or equal to $P_n$ by controlling a power of one or more of the plurality of beams to be less than a beam power threshold.

* * * * *

UNITED STATES PATENT AND TRADEMARK OFFICE
CERTIFICATE OF CORRECTION

PATENT NO. : 11,456,783 B2
APPLICATION NO. : 17/380807
DATED : September 27, 2022
INVENTOR(S) : Xiaojun Zheng et al.

It is certified that error appears in the above-identified patent and that said Letters Patent is hereby corrected as shown below:

In the Claims

In Column 36, In Line 39, In Claim 6, delete "$E_n,$" and insert -- $E_n$ --.

In Column 36, In Line 42, In Claim 6, delete "$E_n,$" and insert -- $E_n$ --.

In Column 36, In Line 43, In Claim 6, delete "$X_n,$" and insert -- $X_n$ --.

In Column 37, In Line 25, In Claim 12, delete "(EMF)," and insert -- (EMF) --.

In Column 37, In Line 45 (approx.), In Claim 14, delete "$\varphi_n^2, \theta_n^1$" and insert -- $\varphi_n^2$, or $\theta_n^1$ --.

In Column 38, In Line 2, In Claim 15, delete "R" and insert -- $R_n$ --.

In Column 38, In Line 5-6, In Claim 15, delete "$\varphi_n^{min}$ to $\varphi_n^{max}$, and wherein $\theta_n^d$ is a value from $\varphi_n^{min}$ to $\varphi_n^{max}$." and insert -- $\theta_n^{min}$ to $\theta_n^{max}$. --.

In Column 38, In Line 33, In Claim 19, delete "period" and insert -- period T --.

Signed and Sealed this
Twenty-fifth Day of April, 2023

Katherine Kelly Vidal
*Director of the United States Patent and Trademark Office*